(12) United States Patent
Maejima et al.

(10) Patent No.: US 10,029,871 B2
(45) Date of Patent: Jul. 24, 2018

(54) IMAGE FORMING APPARATUS AND SETTING METHOD

(71) Applicants: Keita Maejima, Kanagawa (JP); Shingo Nishizaki, Kanagawa (JP); Yuji Ikeda, Kanagawa (JP); Takuya Murata, Tokyo (JP); Kazuho Satoh, Kanagawa (JP)

(72) Inventors: Keita Maejima, Kanagawa (JP); Shingo Nishizaki, Kanagawa (JP); Yuji Ikeda, Kanagawa (JP); Takuya Murata, Tokyo (JP); Kazuho Satoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/590,380

(22) Filed: May 9, 2017

(65) Prior Publication Data
US 2017/0336748 A1 Nov. 23, 2017

(30) Foreign Application Priority Data

May 20, 2016 (JP) .................. 2016-101310
Feb. 3, 2017 (JP) .................. 2017-018781

(51) Int. Cl.
*B65H 7/02* (2006.01)
*G03G 15/00* (2006.01)
*H04N 1/00* (2006.01)

(52) U.S. Cl.
CPC ........... *B65H 7/02* (2013.01); *G03G 15/6591* (2013.01); *G03G 15/6594* (2013.01);
(Continued)

(58) Field of Classification Search
CPC ........ B65H 2200/01; B65H 7/00; B65H 7/02; B65H 7/12; B65H 7/125; B65H 7/14;
(Continued)

(56) References Cited

U.S. PATENT DOCUMENTS 3,951,264 A * 4/1976 Heidecker ............ G11B 17/049
206/303
5,836,532 A * 11/1998 Thompson ........... B65H 63/006
242/485.6
(Continued)

FOREIGN PATENT DOCUMENTS

JP 2005-308829 11/2005
JP 2009-104116 5/2009
(Continued)

*Primary Examiner* — Prasad V Gokhale
(74) *Attorney, Agent, or Firm* — IPUSA, PLLC

(57) ABSTRACT

An image forming apparatus is provided that forms an image on a sheet material based on a sheet material setting relating to the sheet material. The image forming apparatus includes an accepting unit configured to accept a selection of a sheet material type, a thickness measurement unit configured to measure a thickness of the sheet material, and a setting determination unit configured to determine the sheet material setting that relates to the thickness of the sheet material based on the sheet material type accepted by the accepting unit and the thickness of the sheet material measured by the thickness measurement unit.

18 Claims, 23 Drawing Sheets

(52) U.S. Cl.
CPC ..... *H04N 1/00352* (2013.01); *B65H 2220/01* (2013.01); *B65H 2511/10* (2013.01); *B65H 2511/13* (2013.01); *G03G 2215/00738* (2013.01); *G03G 2215/00751* (2013.01)

(58) Field of Classification Search
CPC .. B65H 7/20; B65H 2511/00; B65H 2511/10; B65H 2511/13; G03G 15/6591; G03G 15/6594; G03G 2215/00738; G03G 2215/00751; H04N 1/00352
See application file for complete search history.

(56) References Cited

U.S. PATENT DOCUMENTS

| | | | |
|---|---|---|---|
| 7,831,160 | B2 | 11/2010 | Murakami |
| 8,794,626 | B2 | 8/2014 | Takenaka et al. |
| 8,950,750 | B2 | 2/2015 | Wakabayashi et al. |
| 9,085,428 | B2 | 7/2015 | Ikeda |
| 9,126,787 | B2 | 9/2015 | Adachi et al. |
| 9,499,363 | B2 | 11/2016 | Wakabayashi et al. |
| 2008/0308664 | A1* | 12/2008 | Vega ............ B65H 59/384 242/364.7 |
| 2009/0269090 | A1* | 10/2009 | Murakami ......... G03G 15/5029 399/45 |
| 2010/0310261 | A1* | 12/2010 | Matsushima ............ B65H 7/12 399/16 |
| 2011/0210505 | A1* | 9/2011 | Tomii ............ B65H 7/02 271/265.04 |
| 2011/0210506 | A1* | 9/2011 | Yamazaki ............ B65H 7/02 271/265.04 |
| 2012/0027477 | A1* | 2/2012 | Nakayama ......... G03G 15/2064 399/328 |
| 2014/0079460 | A1* | 3/2014 | Kanaya ............ B65H 7/14 400/583 |
| 2015/0254025 | A1 | 9/2015 | Watanabe et al. |
| 2016/0139554 | A1* | 5/2016 | Yoshimizu ............ B65H 7/02 399/367 |

FOREIGN PATENT DOCUMENTS

| | | |
|---|---|---|
| JP | 2014-088253 | 5/2014 |
| JP | 2015-170895 | 9/2015 |

* cited by examiner

| PAPER TYPE | APPROXIMATE FORMULA | CORRELATION COEFFICIENT |
|---|---|---|
| PAPER TYPE A | $f(x) = ax+b$ | 0.7 OR MORE |
| PAPER TYPE B | $f(x) = a'x+b'$ | 0.7 OR MORE |
| PAPER TYPE C | $f(x) = a''x+b''$ | 0.7 OR MORE |
| PAPER TYPE D | $f(x) = a'''x+b'''$ | 0.7 OR MORE |

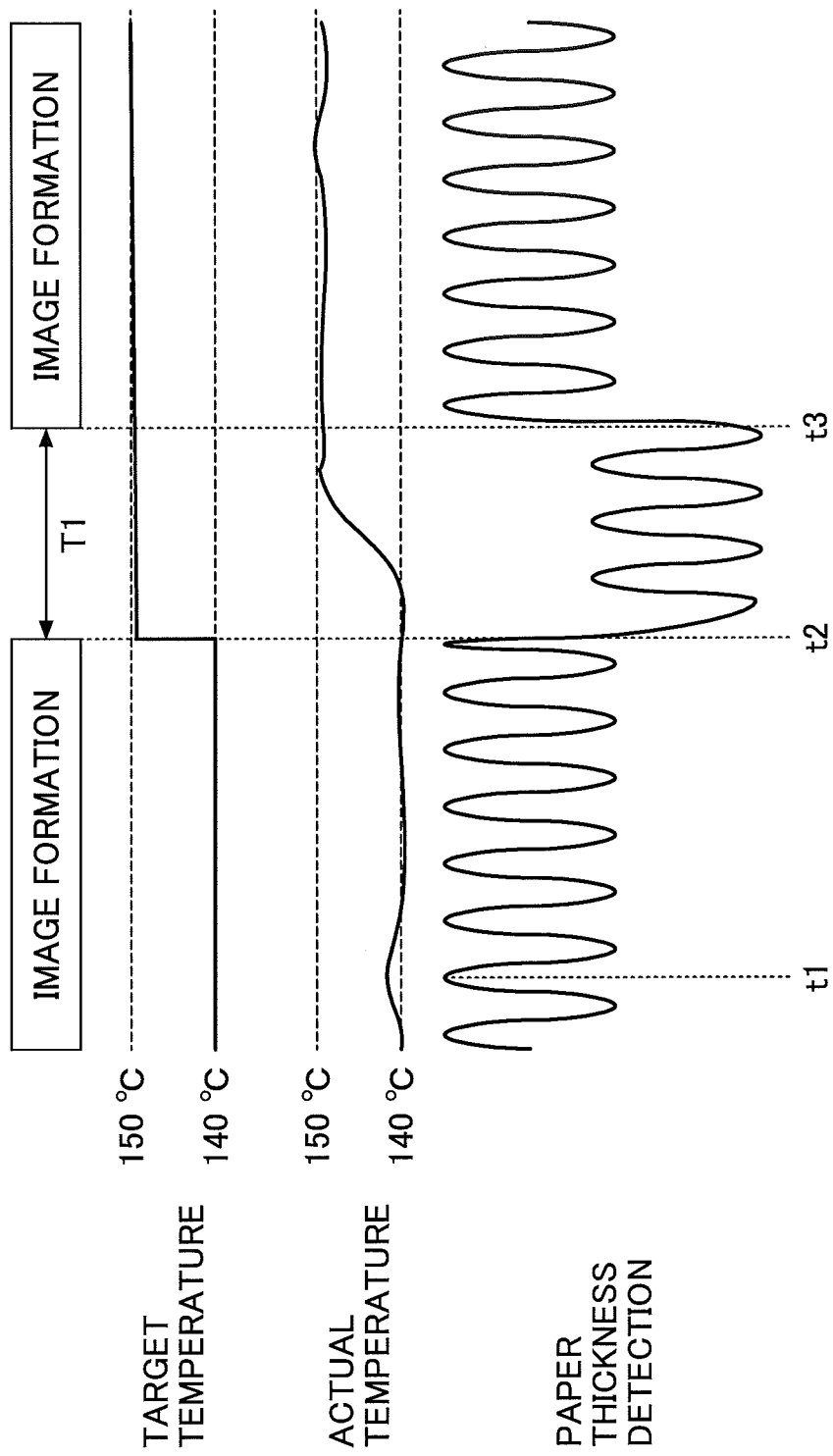

IMAGE FORMING APPARATUS AND SETTING METHOD

CROSS-REFERENCE TO RELATED APPLICATIONS

The present application claims priority under 35 U.S.C. § 119 to Japanese Patent Application No. 2016-101310 filed on May 20, 2016 and Japanese Patent Application No. 2017-018781 filed on Feb. 3, 2017, the entire contents of which are incorporated herein by reference.

BACKGROUND OF THE INVENTION

1. Field of the Invention

The present invention relates to an image forming apparatus and a setting method.

2. Description of the Related Art

An image forming apparatus forms an image on a sheet material such as paper to print out the image, but optimum settings for printing are known to vary depending on the type of sheet material used. For example, because plain paper and coated paper have different heat transfer properties, the fixing temperature of a fixing unit and/or the paper conveying speed may be variably controlled depending on whether printing is performed on plain paper or coated paper. By changing settings depending on the type of sheet material used in the above-described manner, printing quality may be improved, for example.

In this respect, techniques are known for assisting an image forming apparatus in setting up appropriate settings based on the type of paper used. For example, a fax apparatus is known that inquires a user about the type of paper being used upon detecting paper being set in a paper feed unit to perform printing according to the type of paper set by the user (see e.g., Japanese Unexamined Patent Publication No. 2015-170895).

In the paper setting method as described above, the paper size and thickness are determined based on the paper type set up by the user. For example, in the case of printing on label paper, the user can select label paper with a predetermined paper size and a predetermined thickness as the paper type and appropriate settings may be set up based on the paper type selected by the user. However, there are times when appropriate settings cannot be set up based on the paper type.

For example, it is difficult to set up appropriate settings only based on the paper type in the case where the selected paper type may be in different paper sizes and thicknesses, such as plain paper or coated paper. For example, plain paper is used for printing in a majority of cases, and techniques are known for enabling selection of a paper size of plain paper. On the other hand, plain paper may also be in various thicknesses (paper weights) but techniques for setting up settings related to paper thickness are not well known. Also, in the case of using coated paper, even if the user is aware that coated paper has to be specified as the paper type and settings related to paper thickness have to be specified, the user may not be able to set up the appropriate settings related to paper thickness, for example.

Note that even when the user does not set up the paper size and the paper thickness, for example, sensing technology may be used to enable an image forming apparatus to detect paper properties, such as the paper size and the paper thickness, and set up appropriate paper settings based on the detection. However, installing sensors for detecting such paper properties in an image forming apparatus may not be practical due to increased costs, for example.

SUMMARY OF THE INVENTION

An aspect of the present invention is directed to providing an image forming apparatus that provides support for setting up sheet material settings based on a sheet material to be used.

According to one embodiment of the present invention, an image forming apparatus is provided that forms an image on a sheet material based on a sheet material setting relating to the sheet material. The image forming apparatus includes an accepting unit configured to accept a selection of a sheet material type, a thickness measurement unit configured to measure a thickness of the sheet material, and a setting determination unit configured to determine the sheet material setting that relates to the thickness of the sheet material based on the sheet material type accepted by the accepting unit and the thickness of the sheet material measured by the thickness measurement unit.

BRIEF DESCRIPTION OF THE DRAWINGS

FIG. 19 is a diagram illustrating the paper thickness correction timing;

DESCRIPTION OF THE EMBODIMENTS

In the following, embodiments of the present invention are described with reference to the accompanying drawings.

First Embodiment

Figure 1:
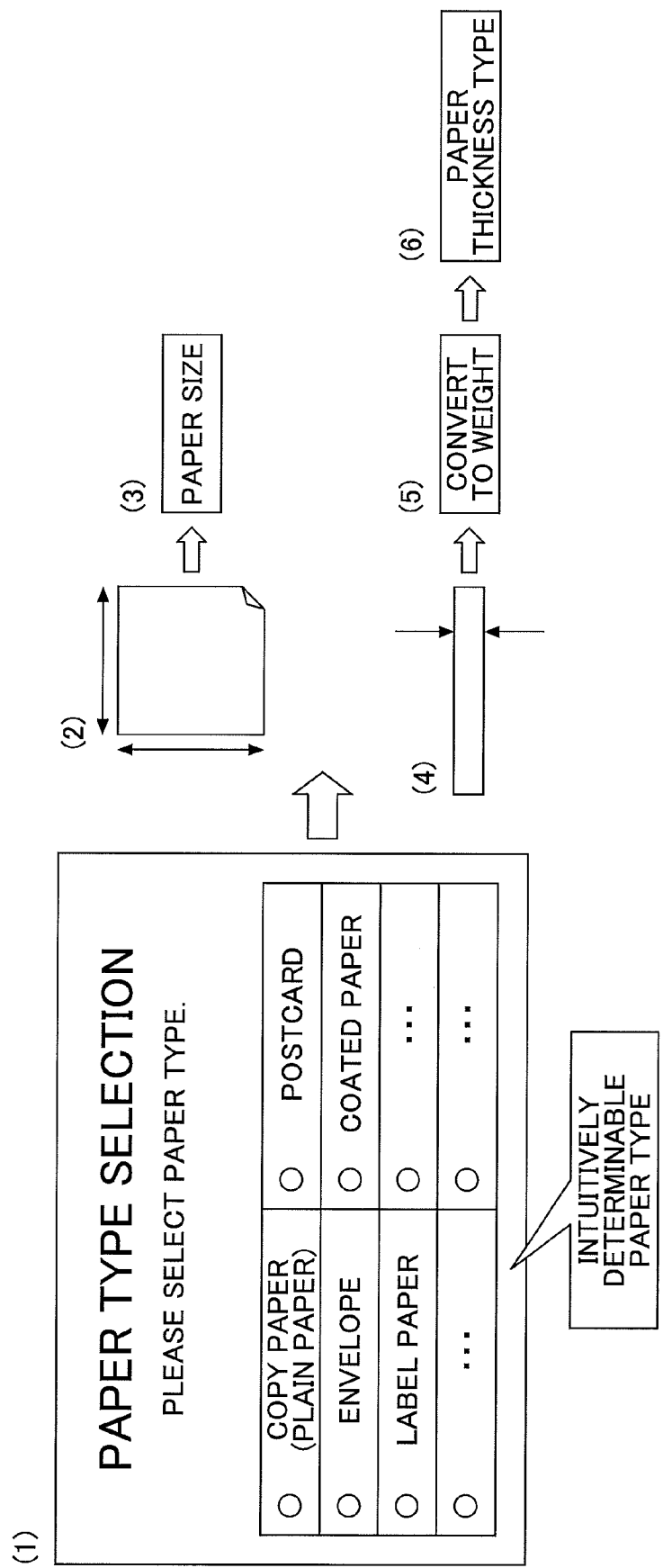
FIG. 1 is a diagram schematically illustrating an example process implemented by an image forming apparatus for setting up paper settings.

FIG. 1 is a diagram schematically illustrating an example process for setting up paper settings implemented by an image forming apparatus.

(1) When a user performs printing, the image forming apparatus inquires the user about the paper type to be used. For example, a paper type selection screen for prompting the user to select a paper type may be displayed on an operation panel of the image forming apparatus. According to an aspect of the present embodiment, the paper type selection screen is configured to display paper types that can be visually and intuitively determined by the user. That is, the image forming apparatus according to the present embodiment displays only paper types that can be intuitively recognized and selected by the user without measuring the paper thickness and the paper size, for example. When the user selects a paper type, the image forming apparatus accepts the paper type selected by the user.

(2) Then, the image forming apparatus measures the vertical and horizontal dimensions (length and width) of the paper.

(3) Once the vertical and horizontal dimensions of the paper are determined, the paper size corresponding to the vertical and horizontal dimensions can be determined by referring to a table associating paper sizes with corresponding dimensions, for example. According to an aspect of the present invention, because the paper type to be used can be narrowed down based on the selection made by the user, the determination of the paper size may be facilitated.

(4) Further, the image forming apparatus measures the thickness of the paper.

(5) Once the thickness of the paper is determined, the image forming apparatus converts the measured thickness to paper weight using a conversion formula for converting paper thickness to paper weight. Note that there is a strong correlation between paper thickness and paper weight for each paper type, and conversion formulas are specifically created for each paper type that may be selected by the user. According to an aspect of the present embodiment, by measuring the thickness of paper, the paper thickness can be appropriately converted into a corresponding paper weight based on the paper type selected by the user.

(6) Once the paper weight is determined, the image forming apparatus can determine a paper thickness type based on the paper weight by referring to a table associating paper thickness types with corresponding paper weights, for example.

Based on the paper size and the paper thickness type determined in the above-described manner, appropriate paper settings may be set up in the image forming apparatus. That is, based on the paper size and the paper thickness type that have been determined, appropriate settings relating to a paper conveying speed, a fixing temperature, a bias voltage, and the like may be set up in the image forming apparatus.

Note that in the case where the image forming apparatus measures the paper dimensions and the paper thickness to set up appropriate paper settings, the image forming apparatus may typically be required to measure the vertical and horizontal dimensions of the paper in units of 1 mm and also accurately measure the weight of one sheet of paper. Such measurement accuracy is required in view of the existence of different types of paper having similar dimensions and the difficulty of measuring one sheet of paper (because one sheet is light but takes up space). Thus, the image forming apparatus may incur increased sensor costs and increased mechanical costs for properly operating the sensors.

In this respect, according to an aspect of the present embodiment, the paper type is first selected by a user from a list of paper types that can be intuitively determined by the user, and in this way, the wrong paper type would be less likely to be mistakenly selected by the user. Also, because the paper type is selected by the user, the corresponding paper sizes can be narrowed down based on the selected paper type. Similarly, because the paper type is selected by the user, a conversion formula for converting thickness to paper weight which varies depending on the paper type can be selected based on the selected paper type, and the selected conversion formula can be used to accurately convert paper thickness to paper weight. Also, according to an aspect of the present embodiment, paper properties (e.g., paper size, paper thickness) can be accurately determined without using a highly accurate sensor.

Terminology

A sheet material refers to a sheet member used for printing purposes. Note that any type of material that can be supplied to an image forming apparatus and discharged therefrom can be considered a sheet material. Examples of sheet materials include, but are not limited to, paper, OHP (overhead projector) film, plastic film, prepreg, copper foil, and the like. In the following description of embodiments, the term "paper" will be used as an example of a sheet material.

A sheet material setting relating to a sheet material refers to a setting implemented in an image forming apparatus that is determined based on the sheet material used. The image forming apparatus implements optimum control based on the sheet material setting. For example, a sheet material size and a sheet material thickness type are examples of sheet material settings relating to the sheet material. Further, the sheet material settings may include a sheet material type in some cases. Also, the sheet material settings may include the smoothness and the Young's modulus of the sheet material, for example. In the following description of embodiments, the term "paper settings" will be used to refer to sheet material settings.

The sheet material setting that relates to the thickness of the sheet material is a sheet material setting that depends on the thickness of the sheet material. The image forming apparatus divides sheet material thicknesses into a number of groups as sheet material settings relating to the thickness of the sheet material (see e.g., paper weights divided into groups in paper thickness table of Table 2 below). Specifically, the sheet material settings that relate to the thickness of the sheet material includes sheet material thickness types corresponding to the names of the group of the sheet material thicknesses. Also, the sheet material settings that relate to the thickness of the sheet material thickness may include the weight (grammage) and the Young's modulus correlated with the sheet material thickness. Note that in the embodiments described below, paper weights are divided into groups so that a certain level of print quality can be obtained without finely subdividing controls to be implemented. However, in some embodiments, the weight of the sheet material itself can be used as the sheet material setting relating to the sheet material thickness, for example.

The sheet material type is a classification of the sheet material determined based on properties of the sheet material, for example. Specifically, the sheet material type of a sheet material may be determined based on properties of the sheet material, such as size, thickness, weight, density, Young's modulus, smoothness, and appearance of the sheet material, for example. In the following description of embodiments, the term "paper type" is used to refer to the sheet material type.

The thickness of the sheet material refers to the dimension of the sheet material in the thickness direction. The weight refers to the weight of the sheet material per unit area. There is a correlation between the sheet material thickness and the weight of the sheet material in that the sheet material thickness increases as the thickness increases. However, this correlation often varies depending on the sheet material type.

The sheet material thickness type refers to a group of sheet material thicknesses classified by weight. Specifically, examples of sheet material thickness types may include "plain paper", "thin paper", "middle thickness paper", "thick paper 1", "thick paper 2", "thick paper 3", and the like.

The size of the sheet material may be a size type or a size name indicating the size of the sheet material, for example. The size of a sheet material is most likely a fixed size defined by conventions, international/national standards, or industry standards, for example. In many cases, fixed sizes are defined for each type of sheet material. For example, sheet material sizes of plain paper may include A3, A4, B4, and B5 (based on ISO 216). Also, sheet material sizes of envelopes may include "Kaku 2", "Chou 3", and "Youchou 3", for example (based on JIS). Note that in the following description of embodiments, the term "paper size" is used to refer to the sheet material size.

<Configuration>

Figure 2:
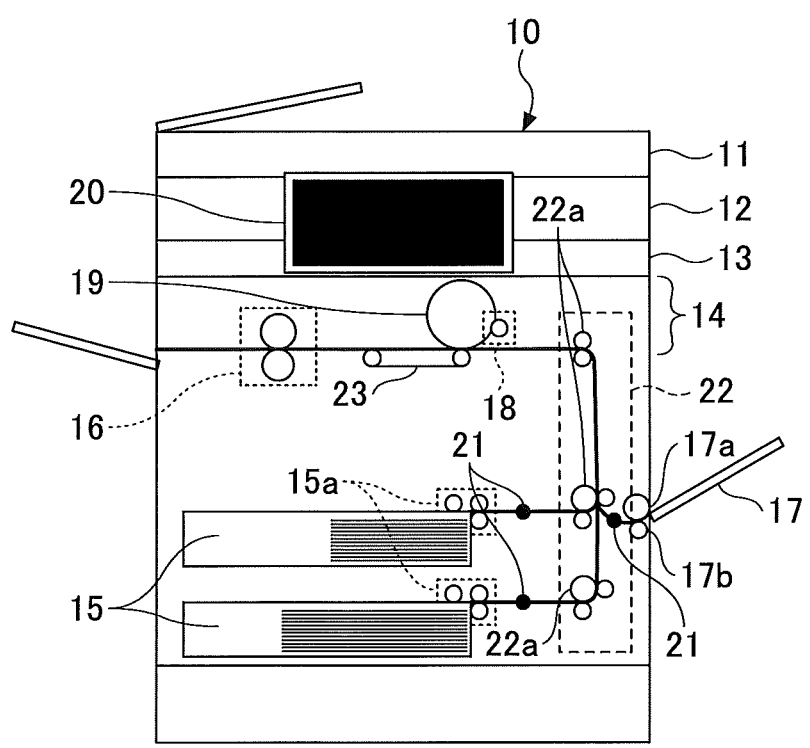
FIG. 2 is a diagram illustrating an example schematic configuration of the image forming apparatus.

FIG. 2 is a diagram illustrating an example schematic configuration of an image forming apparatus 10 according to the present embodiment. The image forming apparatus 10 of FIG. 2 is a so-called digital multifunction peripheral (MFP) that includes a copy function, a printer function, a facsimile function, a scanner function, and the like. A user can arbitrarily select a desired function to be implemented from among the copy function, the printer function, the facsimile function, and the scanner function by operating an application switch key of an operation panel 20, for example. When the user selects the copy function, the image forming apparatus 10 may operate in copy mode, and when the user selects the printer function, image forming apparatus 10 may operate in printer mode, for example. When the user selects the facsimile function, image forming apparatus 10 may operate in facsimile mode, and when the user selects the scanner function, image forming apparatus 10 may operate in scanner mode, for example.

The image forming apparatus 10 includes an automatic document feeder (ADF) 11, an image scanning device 12, a write unit 13, an image forming engine 14, the operation panel 20, a fixing device 16, a manual feed tray 17, and two paper feed trays 15.

The operation panel 20 is an input/output unit including a touch panel formed on a display, such as liquid crystal display (LCD) or an organic electroluminescent (EL) display, for example. The operation panel 20 displays various types of information and soft keys, and accepts user operations. Note that one or more hard keys, such as a start button for accepting a print start operation, may be arranged at a peripheral portion of the operation panel 20, for example.

The automatic document feeder 11 extracts a document placed therein one page at a time, delivers the document on a contact glass, and discharges the document to a discharge tray after the document is scanned by the image scanning device 12. The image scanning device 12 illuminates the document on the contact glass by moving an exposure lamp mounted on a carriage and forms an image of the document on a line sensor, such as a CCD, via a lens, a mirror, and the like. The image scanning device 12 also implements processes, such as shading correction, MTF correction, and/or gamma correction, on the image, and temporarily stores image data (digital data) of the image that has been subjected to these processes in a storage unit such as a RAM, for example.

The image forming engine 14 includes a photosensitive drum 19 as an image carrier and a developing device 18. The photosensitive drum 19 is driven to rotate in the clockwise direction in FIG. 2, and the surface of the photosensitive drum 19 is charged to a predetermined potential by a charging device. The write unit 13 irradiates the photosensitive drum 19 with the laser light modulated based on the image data. In this way, an electrostatic latent image is formed on the surface of the photosensitive drum 19. The developing device 18 is a device for causing adsorption of toner on the surface of the photosensitive drum 19 based on the electrostatic latent image formed on the surface of the photosensitive drum 19. This toner is then transferred to paper.

The paper feed trays 15 store various types of paper, and one of the paper feed trays 15 storing the type of paper selected by the user feeds paper to a conveying path 22 using a paper feed roller 15a. The conveying path 22 includes a number of conveying rollers 22a for conveying the paper to the photosensitive drum 19. The fixing device 16 is a device for fixing a toner image on paper with heat and pressure.

The manual feed tray 17 is a paper feed mechanism for enabling the user to manually feed arbitrary paper into the conveying path 22 to print an image thereon. The manual feed tray 17 may be used to feed plain paper as well as relatively thick paper, envelopes, and the like. A paper thickness detection sensor 21 is disposed between the paper feed roller 17a of the manual feed tray 17 and the conveying roller 22a. The paper thickness detection sensor 21 is a sensor for measuring the thickness of the paper that has been fed, the details of which will be described below with reference to FIG. 6. Note that paper thickness detection sensors 21 may also be disposed between the paper feed rollers 15a of the paper feed trays 15 and the conveyance roller 22a. In this way, the image forming apparatus 10 may be able to measure the thickness of paper fed from the paper feed trays 15.

Also, the manual feed tray 17 includes a paper size detection sensor. The paper size detection sensor is a sensor for measuring the vertical and horizontal dimensions of paper. Note that the paper size detection sensor of the manual feed tray 17 will be described in detail below with reference to FIG. 5. The paper feed trays 15 also include paper size detection sensors. Note that the paper size detection sensors of the paper feed trays 15 will be described in detail below with reference to FIGS. 4A and 4B.

In the following, an operation procedure of the image forming apparatus 10 performing an image forming operation will be briefly described taking an operation in the copy mode as an example. First, the user operates the operation panel 20 to set up relevant settings for specifying how printing is to be performed in the copy mode. For example, the user may set up paper settings (e.g., paper type, paper size, paper thickness), density settings, scale settings, aggregation settings, and the like. Then a bundle of documents placed on the automatic document feeder 11 is sequentially fed to the contact glass. The document is fed to the image scanning device 12, which scans the document and generates image data of the document. The image data is then subjected to image processing by the image scanning device 12 and the write unit 13, and the processed image data is then converted into optical information by the write unit 13.

The image forming engine 14 uniformly charges the photosensitive drum 19 with a charging device and exposes the photosensitive drum 19 to laser light irradiated by the write unit 13. An electrostatic latent image formed on the photosensitive drum 19 is developed into a toner image by the developing device 18. One of the paper feed trays 15 feeds paper to the conveying path 22, and the conveying path 22 conveys the paper to the photosensitive drum 19. The toner image on the photosensitive drum 19 is then transferred to the paper by a secondary transfer voltage so that the toner image is formed on the paper. The paper is then conveyed to the fixing device 16 by a conveying belt 23, and the toner image is fixed onto the paper by the fixing device 16 after which the paper is discharged.

Note that the above-described configuration of the image forming apparatus 10 is merely one illustrative example. Further, the image forming apparatus 10 does not necessarily have to be a multifunction peripheral as long as it includes a print function. For example, the image forming apparatus 10 may be a printer, a copying machine, a facsimile machine, and the like.

<Hardware Configuration>

Figure 3:
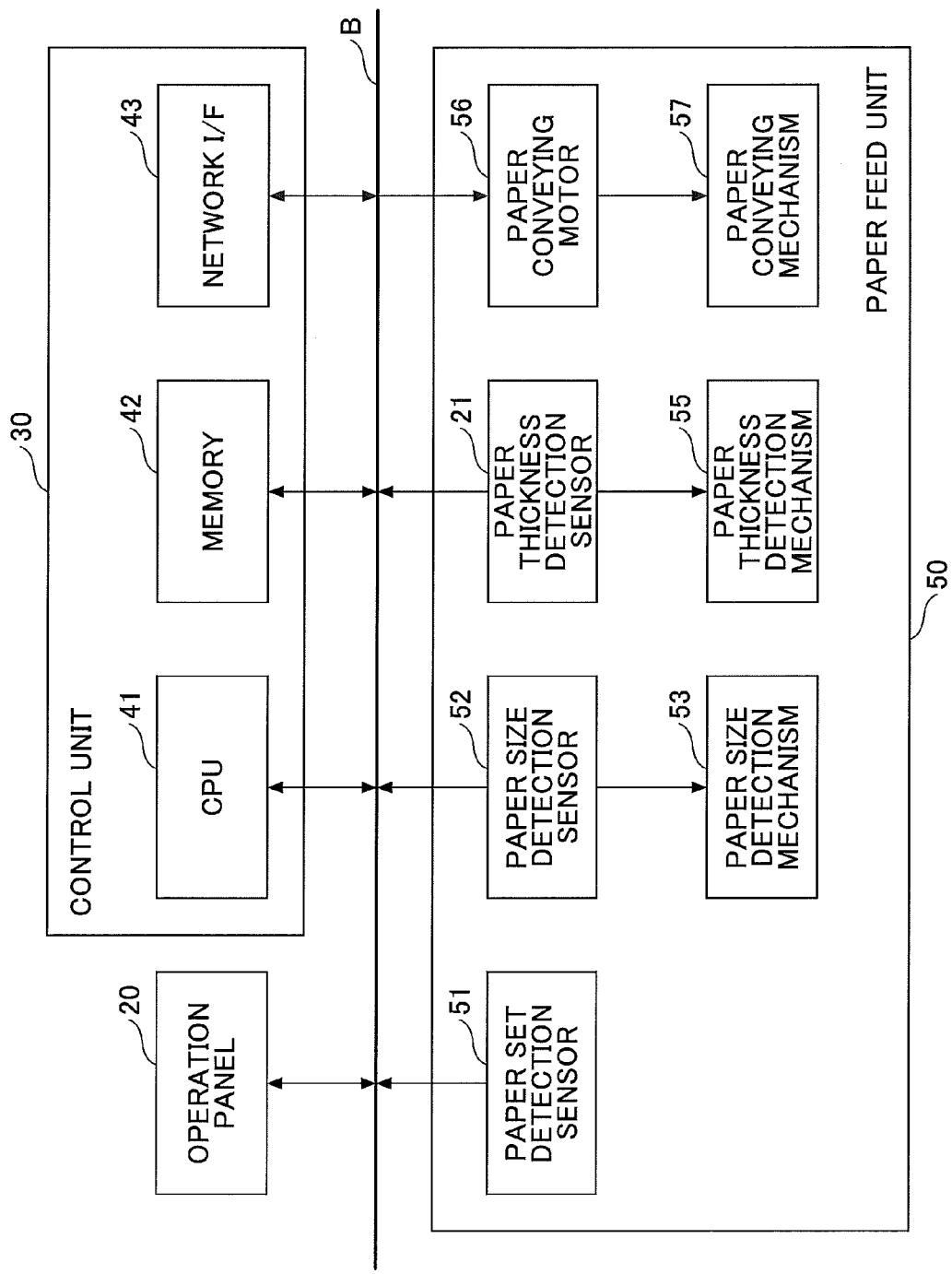
FIG. 3 is a diagram illustrating an example hardware configuration diagram of the image forming apparatus.

FIG. 3 is a diagram illustrating an example hardware configuration of the image forming apparatus 10. In FIG. 3, the image forming apparatus 10 includes a control unit 30, the operation panel 20, and a paper feed unit 50 as main components.

The control unit 30 includes a CPU 41, a memory 42, and a network I/F (interface) 43 that are connected to a bus B. The CPU 41 executes a program stored in the memory 42 to control overall operations of the control unit 30. The memory 42 may be a nonvolatile memory such as, an SSD (Solid State Drive) or an HDD (Hard Disk Drive), or a volatile memory, such as a DRAM, for example. The memory 42 stores programs and data. Further, the memory 42 stores information input to the image forming apparatus 10 and information held by the image forming apparatus 10 in advance.

The network I/F 43 is a communication device for communicating with an external device via a network such as a LAN or the Internet.

Note that for the sake of simplicity, FIG. 3 illustrates only a basic configuration of the control unit 30. That is, the control unit 30 may have a general configuration of a microcomputer or an information processing apparatus, including a ROM, an interrupt controller, a communication device for establishing communication via a network, an interface with an external device, and the like, for example.

The paper feed unit 50 includes at least one of the paper feed trays 15 and the manual feed tray 17. The paper feed unit 50 includes a paper set detection sensor 51, a paper size detection sensor 52, the paper thickness detection sensor 21, and a paper conveying motor 56 that are connected to the bus B so that they can transmit detection results and the like to the CPU 41 and receive control signals from the CPU 41, for example. The paper set detection sensor 51 detects that paper has been set in the manual feed tray 17 or the paper feed tray 15. The paper set detection sensor 51 may be any sensor that is capable of detecting the existence of paper even when only one sheet of paper is set. For example, a weight sensor having a switch that is turned on upon detecting the weight of one sheet of paper or a sensor for detecting paper based on light reflection may be used as the paper set detection sensor 51. Note, however, that the paper set detection sensor 51 is not limited to the above examples.

The paper size detection sensor 52 is a sensor for detecting the vertical and horizontal dimensions of paper. Note that the configuration of the paper size detection sensor 52 varies depending on whether the paper size detection sensor 52 is included in the manual feed tray 17 or the paper feed tray 15. The paper thickness detection sensor 21 is a sensor for measuring the thickness of one sheet of paper. The paper conveying motor 56 is a motor that drives a paper conveying mechanism 57 to convey one sheet of paper from the manual feed tray 17 or the paper feed tray 15 to a paper thickness detection mechanism 55.

The paper size detection sensor 52 is mounted in the image forming apparatus 10 by a paper size detection mechanism 53, which is a mechanical mechanism for mounting the paper size detection sensor 52. For example, the paper size detection mechanism 53 may include a mounting portion of the paper size detection sensor 52 and a mechanism for enabling the paper size detection sensor 52 to operate and deform. The paper thickness detection mechanism 55 is a mechanical mechanism for mounting the paper thickness detection sensor 21 in the image forming apparatus 10. For example, the paper thickness detection mechanism 55 may include a mounting portion of the paper thickness detection sensor 21 and a mechanism for enabling the paper thickness detection sensor 21 to operate and deform. The paper conveying mechanism 57 is a mechanical mechanism that is driven by the paper conveying motor 56 to convey paper to the paper thickness detection mechanism 55. For example, the paper conveying mechanism 57 may include the paper feed rollers 17a and 15a and clutches for holding sheets of paper in contact with the paper feed rollers 17a and 15a.

<Paper Size Sensor>

Figure 4A:
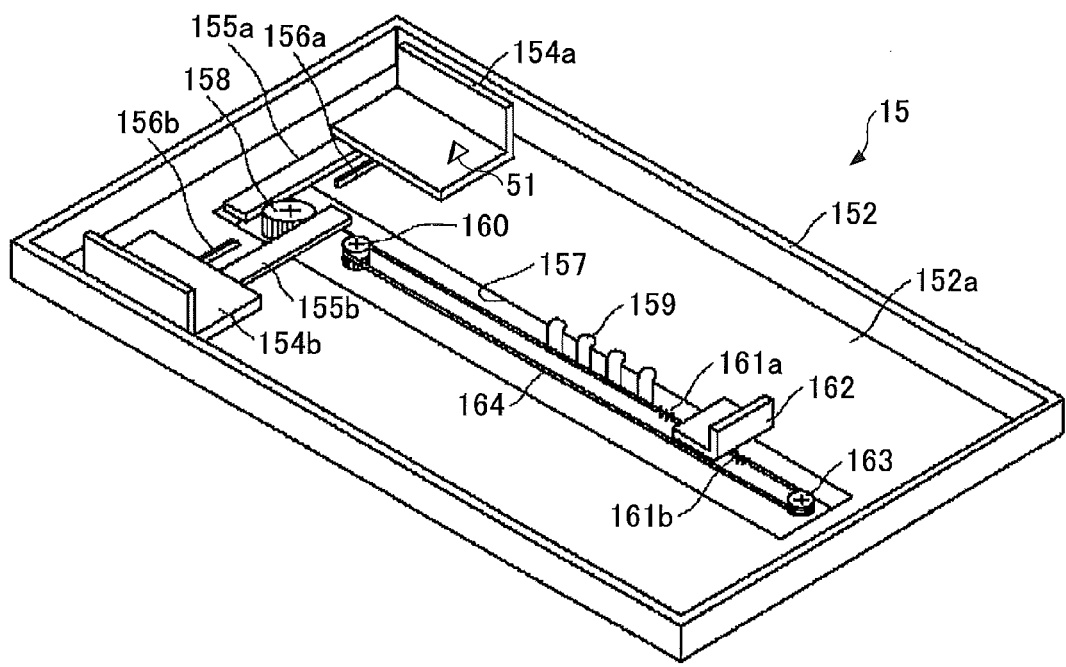
FIGS. 4A and 4B are diagrams illustrating a paper feed unit and a paper size detection sensor arranged in the paper feed unit.
Figure 4B:
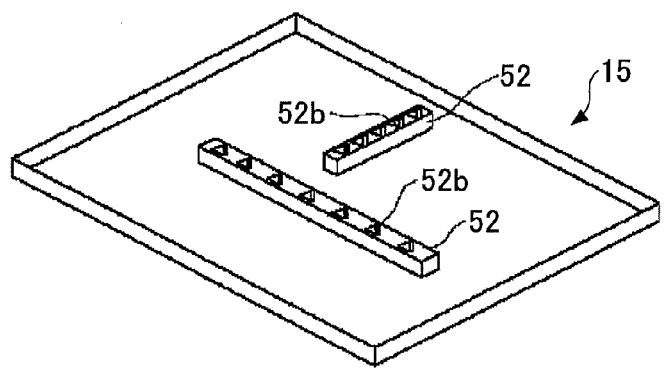

In the following, the paper size detection sensor 52 of the paper feed tray 15 will be described with reference to FIGS. 4A and 4B. FIG. 4A is a diagram illustrating a main structure of the paper feed tray 15, and FIG. 4B is a diagram illustrating an example arrangement of the paper size detection sensor 52.

As illustrated in FIG. 4A, the paper feed tray 15 includes a main case 152 having a pair of opposing side fences 154a and 154b arranged therein facing opposite each other with respect to the width direction of the main case 152. The side fences 154a and 154b are arranged into substantially L-shapes for loading paper. Racks 155a and 155b extending in the width direction of the main case 152 are respectively attached to the side fences 154a and 154b. Also, guide grooves 156a and 156b extending in a moving direction of the side fences 154a and 154b are respectively formed for the side fences 154a and 154b in a bottom plate 152a of the main case 152. The guide grooves 156a and 156b are formed to penetrate through the bottom plate 152a of the main case 152. Also, guide pins are formed on the bottom faces of the side fences 154a and 154b, and these guide pins are inserted into the guide grooves 156a and 156b to move along the guide grooves 156a and 156b.

The racks 155a and 155b mesh with a two-stage gear 158 that is rotatably arranged on the bottom plate 152a of the main case 152, and the side fences 154a and 154b are interlocked with the racks 155a and 155b via the two-stage gear 158 to move in the width direction of the main body case 152.

The paper set detection sensor 51 is arranged on at least one of the side fences 154a and 154b. The paper set detection sensor 51 may include a mechanical switch that is sensitive enough to be pressed down even when only one sheet of paper is placed in the paper feed tray 15, for example. Note, however, that the detection method used by the paper set detection sensor 51 is not limited to detection using a mechanical switch as described above, and in other examples, the paper set detection sensor 51 may use optical paper detection or some other detection method.

Gear pulleys 160 and 163 are arranged on the bottom plate 152a of the main case 152, and a wire 164 engages with the gear pulleys 160 and 163. The two ends of the wire 164 are attached to a guide pin formed on a rear face of an end fence 162 via springs 161a and 161b.

Further, a slide groove 157 is formed in the main case 152, and positioning grooves 159 for positioning the end fence 162 for various paper sizes are formed on a side wall of the slide groove 157. A leaf spring (positioning member) is attached to a rear face of the end fence 162, and when a projecting portion of the leaf spring comes to the position of one of the positioning grooves 159 of the slide groove 157, the projecting portion enters the positioning groove 159 and positions the end fence 162 at corresponding position for a paper size.

As illustrated in FIG. 4B, the paper size detection sensors 52 are arranged below the guide groove 156a and the slide groove 157. The paper size detection sensors 52 include sensor elements 52b that detect a corresponding paper size upon being pressed. By arranging the paper size detection sensors 52 below the guide groove 156a and the slide groove 157, the sensor elements 52b of the paper size detection sensors 52 may be pressed by guide pins of the side fence 154a inserted into the guide groove 156a and the guide pin of the end fence 162 inserted into the slide groove 157 to thereby detect the size of the paper set in the paper feed tray 15.

Note that the above-illustrated configuration of the paper size detection sensor 52 arranged in the paper feed tray 15 is merely one example, and the paper size detection sensor 52 of the paper feed tray 15 may have various other configurations.

Figure 5A:
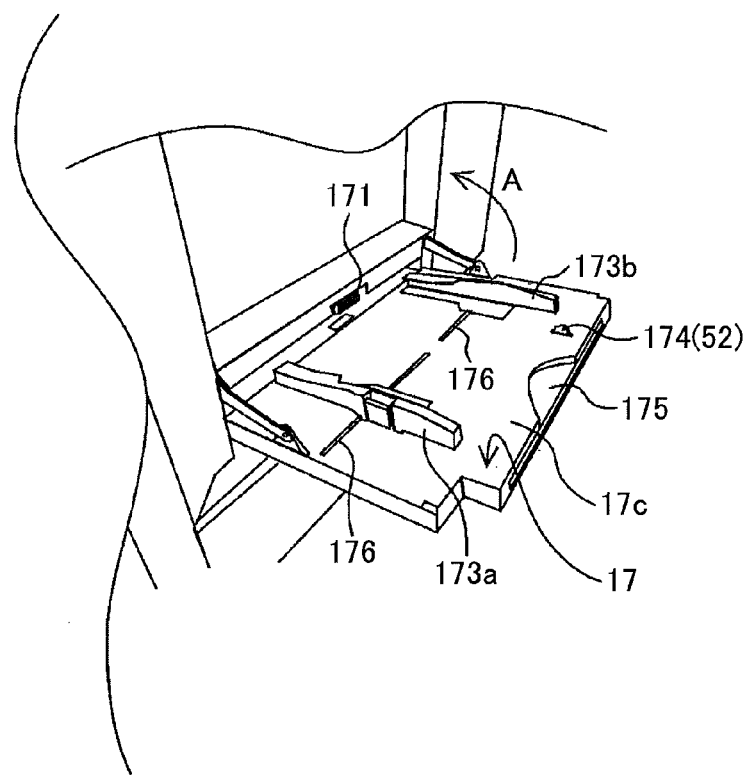
FIGS. 5A and 5B are diagrams illustrating a manual feed tray and a paper size detection sensor arranged in the manual feed tray.
Figure 5B:
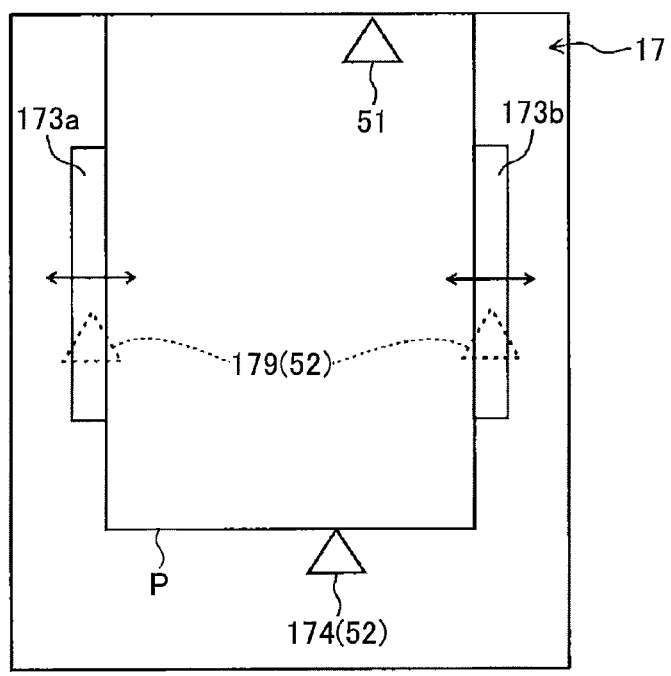

FIGS. 5A and 5B are diagrams illustrating an example configuration of the paper size detection sensor 52 arranged in the manual feed tray 17. FIG. 5A is an example perspective view of the manual feed tray 17, and FIG. 5B is a diagram showing an example arrangement of the paper size detection sensors 52.

The user can rotate the manual feed tray 17 in the direction of arrow A of FIG. 5A to close the manual feed tray 17 and keep it accommodated in the image forming apparatus 10. When the manual feed tray 17 is in the closed state, the manual feed tray 17 does not protrude from the outer wall surface of the image forming apparatus 10 to get in the way of users around the image forming apparatus 10. On the other hand, in the case where a user wishes to use the manual feed tray 17 to feed paper on which printing is to be performed, the user rotates the manual feed tray 17 in the reverse direction of arrow A to open the manual feed tray 17 from the closed state. In this way, the manual feed tray 17 may be in the open state as illustrated in FIG. 5A. Then, the user places paper P to be used on a placement surface 17c of the manual feed tray 17 in the open state and sets the paper P in place on the placement surface 17c so that the front edge of the paper P is positioned at a predetermined position.

In the present embodiment, the manual feed tray 17 includes two side fences 173a and 173b for regulating the positions of side edge portions of the paper P in the width direction that is orthogonal to the conveying direction of the paper P that is placed on the placement surface 17c. The two side fences 173a and 173b are configured to slide and move in conjunction with each other along slide grooves 176 extending in the paper width direction. Specifically, the two side fences 173a and 173b are moved in opposite directions by the same distance in synchronization with each other with respect to a predetermined paper width direction reference position set substantially at a paper width direction center position of the placement surface 17c. Thus, after the paper P to be used is placed on the placement surface 17c, the user moves the two side fences 173a and 173b so that the two side fences 173a and 173b come into contact with the two width direction side edges of the paper P, and in this way, a width direction center position of the paper P can be positioned at the predetermined paper width direction reference position.

Further, in the present embodiment, the manual feed tray 17 includes a paper length sensor 174 as a paper length detection unit for detecting the length in the conveying direction of the paper P placed on the placement surface 17c. The paper length sensor 174 includes a mechanical switch that is sensitive enough to be pushed down even when only one sheet of paper is placed thereon. Specifically, the paper length sensor 174 includes a protrusion that can protrude from the placement surface 17c and recede below the placement surface 17c, and a depression detection unit that can detect whether the protrusion has been pushed down to below the placement surface 17c. In this way, the paper length sensor 174 can detect whether a bottom face of the paper P is in contact with or is nearing a predetermined position on the placement surface 17c of the manual feed tray 17. Thus, based on the detection result of the paper length sensor 174, a determination can be made as to whether the paper length of the paper P set in the manual feed tray 17 is shorter or longer than the conveying direction length of the position of the protrusion of the paper length sensor 174. Note that in some embodiments, a plurality of paper length sensors 174 may be arranged so that the image forming apparatus 10 may be able to determine the paper length in multiple levels.

As illustrated in FIG. 5B, the manual feed tray 17 includes the paper set detection sensor 51 and paper width sensors 179 in addition to the above-described paper length sensor 174. The paper set detection sensor 51 is arranged in the vicinity of a junction between the manual feed tray 17 and the main body of the image forming apparatus 10. The paper set detection sensor 51 outputs a detection signal to the CPU 41 when the paper P is set in the manual feed tray 17. The paper width sensors 179 are integrally arranged with the side fences 173a and 173b and are configured to output the positions of the side fences 173a and 173b in the width direction to the control unit 30 as the width of the paper P. The paper width sensors 179 are distance sensors for measuring the distance between the side fences 173a and 173b. The paper set detection sensor 51 may be any suitable sensor, such as a sensor for detecting paper by reflecting light, for example.

Note that the above-illustrated configuration is merely one example, and the paper size detection sensor 52 of the manual feed tray 17 may have various other configurations.

<Paper Thickness Detection Sensor>

Figure 6A:
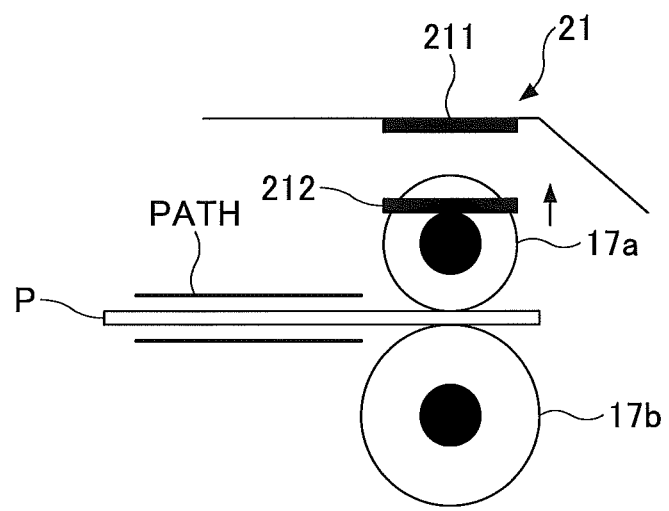
FIGS. 6A and 6B are diagrams illustrating example configurations of a paper thickness detection sensor.
Figure 6B:
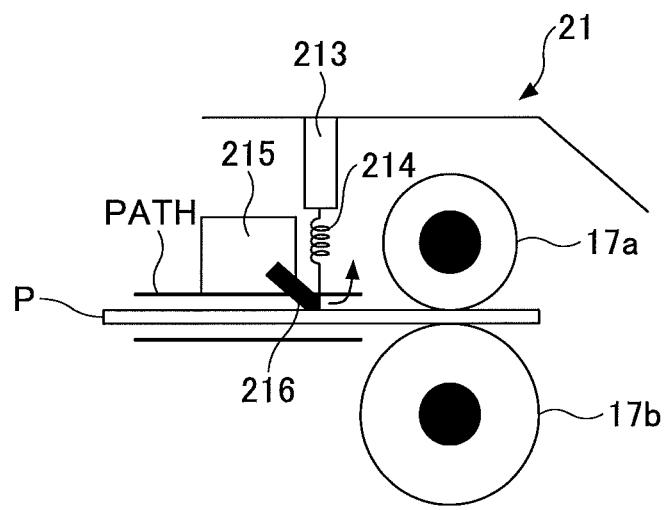

FIGS. 6A and 6B are diagrams illustrating example configurations of the paper thickness detection sensor 21. FIG. 6A is a schematic side view of the paper thickness detection sensor 21. The paper thickness detection sensor 21 includes a displacement measurement sensor 211 and a metal plate 212 that are arranged in a direction perpendicular to a conveying path ("PATH" in FIG. 6A). For example, the upper paper feed roller 17a sends out a sheet of paper to the conveyance path. The lower paper feed roller 17b is fixed, and the upper paper feed roller 17a is movable in a direction perpendicular to the paper conveying direction. Before a sheet of paper P passes between the paper feed rollers 17a and 17b, the paper feed rollers 17a and 17b are in contact with each other, and when the paper P passes between the paper feed rollers 17a and 17b, the paper feed roller 17a moves upward by the thickness of the paper P.

Although the displacement measurement sensor 211 is fixed, the metal plate 212 moves together with the paper feeding roller 17a. In this way, the displacement measurement sensor 211 can measure the displacement of the paper feed roller 17a. The displacement of the paper feed roller may be substantially the same as the thickness of the paper P or at least correlates with the thickness of the paper P, and as such, a paper thickness measurement unit 31 (described below) can measure the thickness of the paper P. Note that the displacement measurement sensor 211 may be any suitable sensor that is capable of measuring a change in distance using techniques, such as optical distance measurement, distance measurement based on magnetic flux displacement, and the like.

Note that in converting the measurement obtained by the displacement measurement sensor 211 into a corresponding paper thickness, environmental changes, such as changes in temperature, humidity, and the like, may be taken into account as necessary, for example.

FIG. 6B is a diagram illustrating another example configuration of the paper thickness detection sensor 21. The paper thickness detection sensor 21 of FIG. 6B is a contact sensor and includes a lever portion 216 that is held at an upper side of the conveying path ("PATH" in FIG. 6B) by a spring 214, for example, and comes into contact with the paper P. The paper thickness detection sensor 21 of FIG. 6B also includes a solenoid 213 that is arranged above the spring 214. The solenoid 213 inserts the paper P that has been conveyed between the lever portion 216 and a stationary portion via the spring 214, for example. The paper thickness detection sensor 21 of FIG. 6B also includes a sensor portion 215 that measures the thickness of the paper P by measuring the distance between the lever portion 216 that is in contact with the paper P and the stationary portion whose position is known. The sensor unit 215 may be a lever encoder, a distance measurement sensor, an ultrasonic sensor, or the like, for example.

<Functional Configuration>

Figure 7:
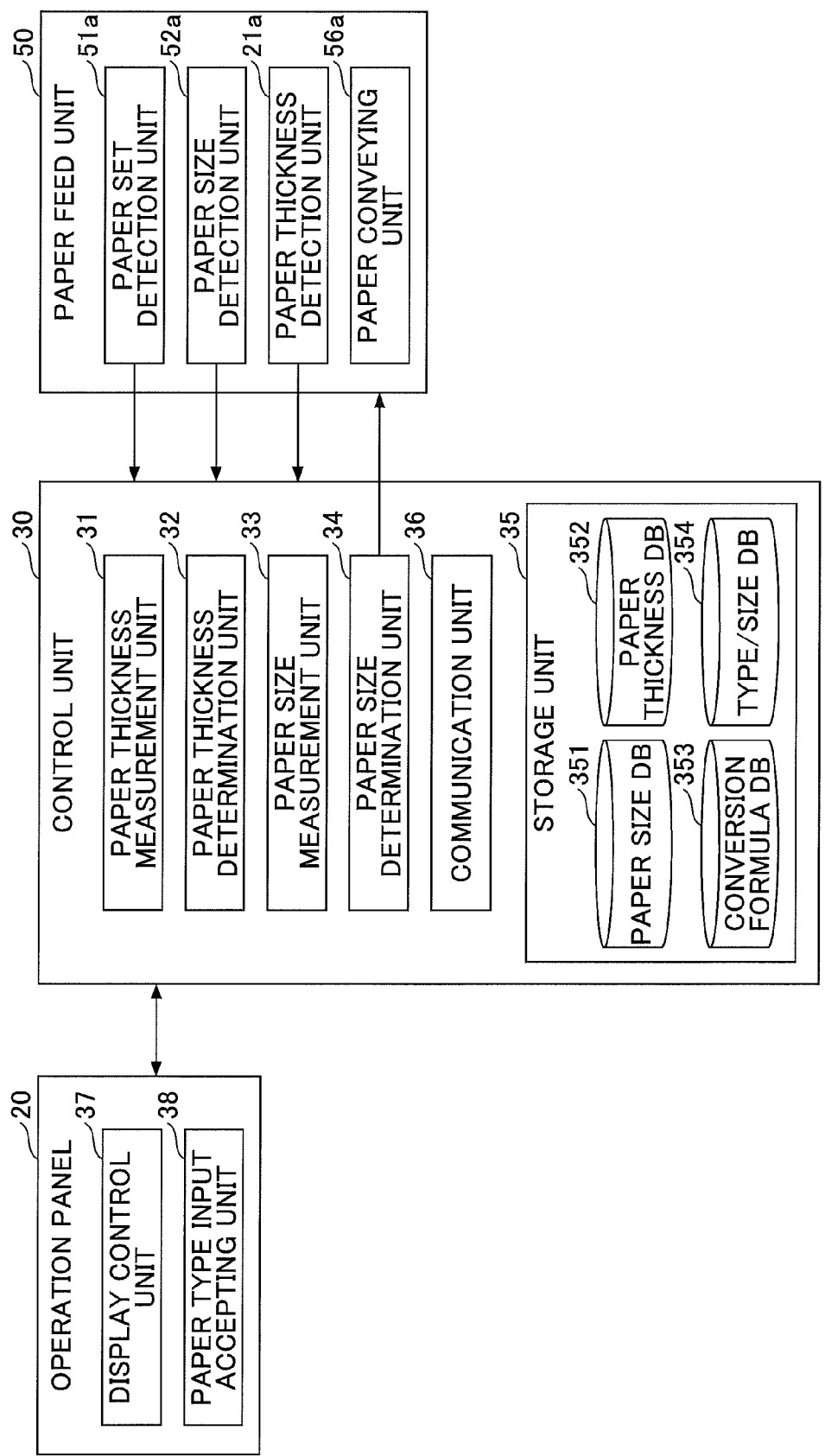
FIG. 7 is a block diagram illustrating an example functional configuration of the image forming apparatus according to a first embodiment of the present invention.

FIG. 7 is a block diagram illustrating an example functional configuration of the image forming apparatus 10.

<<Paper Feed Unit>>

The paper feed unit 50 includes a paper set detection unit 51a, a paper size detection unit 52a, a paper thickness detection unit 21a, and a paper conveying unit 56a. The paper set detection unit 51a may be implemented by the paper set detection sensor 51 of FIG. 3, for example. The paper set detection unit 51a detects paper when paper is set in the manual feed tray 17 or the paper feed tray 15.

The paper size detection unit 52a may be implemented by the paper size detection sensor 52 and the paper size detection mechanism 53 of FIG. 3, for example. The paper size detection unit 52a detects the size of the paper that has been set in the manual feed tray 17 or the paper feed tray 15.

The paper thickness detection unit 21a may be implemented by the paper thickness detection sensor 21 and the paper thickness detection mechanism 55 of FIG. 3, for example. The paper thickness detection unit 21a detects the thickness of one sheet of paper set in the manual feed tray 17 or the sheet feed unit 15.

The paper conveying unit 56a may be implemented by the paper conveying motor 56 and the paper conveying mechanism 57 of FIG. 3, for example. The paper conveying unit 56a conveys the paper set in the manual feed tray 17 or the sheet supply unit 15 to the paper thickness detection sensor 21.

<<Operation Panel>>

The operation panel 20 includes a display control unit 37 and a paper type input accepting unit 38. These functional units may be implemented by the CPU 41 of FIG. 3 executing a program stored in the memory 42 to control the operation panel 20 to execute relevant processes.

The display control unit 37 may be implemented by the operation panel 20 and the CPU 41 of FIG. 3 processing instructions, for example. The display control unit 37 displays various types of information on a display of the operation panel 20. For example, the display control unit 37 may display a paper type selection screen for accepting a selection of a paper type.

The paper type input accepting unit 38 may be implemented by the operation panel 20 and the CPU 41 of FIG. 3 processing instructions, for example. The paper type input accepting unit 38 accepts a selection of the paper type from a user.

<<Control Unit>>

The control unit 30 includes the paper thickness measurement unit 31, a paper thickness determination unit 32, a paper size measurement unit 33, a paper size determination unit 34, and a communication unit 36.

The above functional units may be implemented by the CPU 41 of FIG. 3 executing a program stored in the memory 42 to control various hardware elements of the image forming apparatus 10. Further, the control unit 30 includes a storage unit 35 that may be implemented by the memory 42 of FIG. 3 for example. The storage unit 35 includes a paper size DB (database) 351, a paper thickness DB 352, a conversion formula DB 353, and a type/size DB 354.

TABLE 1

| PAPER SIZE | DIMENSIONS (HORIZONTAL × VERTICAL) |
|---|---|
| A3 VERTICAL | 297 × 420 |
| A4 VERTICAL | 210 × 297 |
| A4 HORIZONTAL | 297 × 210 |
| A5 VERTICAL | 148 × 210 |
| A5 HORIZONTAL | 210 × 148 |
| A6 VERTICAL | 105 × 148 |
| A6 HORIZONTAL | 148 × 105 |
| B4 VERTICAL | 257 × 364 |
| B5 VERTICAL | 182 × 257 |
| B5 HORIZONTAL | 257 × 182 |
| B6 VERTICAL | 128 × 182 |
| B6 HORIZONTAL | 182 × 128 |
| STANDARD POSTCARD VERTICAL | 100 × 148 |
| STANDARD POSTCARD HORIZONTAL | 148 × 100 |
| REPLY-PAID POSTCARD VERTICAL | 148 × 200 |
| REPLY-PAID POSTCARD HORIZONTAL | 200 × 148 |
| KAKU 2 VERTICAL | 240 × 332 |
| CHOU 3 VERTICAL | 120 × 235 |
| CHOU 3 HORIZONTAL | 235 × 120 |
| YOUCHOU 3 VERTICAL | 120 × 235 |
| YOUCHOU 3 HORIZONTAL | 235 × 120 |

Table 1 illustrates an example of a paper size table stored in the paper size DB 351. The paper size table registers various paper sizes in association with corresponding paper dimensions. The paper dimensions represent horizontal and vertical dimensions of paper in millimeters. These dimensions are standard values for the corresponding paper sizes. Further, the paper sizes include A3, A4, A5, A6, B4, B5, B6, standard sizes of postcards, and standard sizes of envelopes. Because a user may be able to set paper in certain paper sizes both vertically and horizontally, dimensions for the paper sizes in both vertical and horizontal placements are registered. Note that the user cannot set A3 and B4 papers horizontally in the image forming apparatus 10, and as such, only dimensions for A3 vertical and B4 vertical are registered. In this way, when the paper size detection sensor 52 measures the dimensions of paper, the corresponding paper size can be determined by referring to the paper size table as described above, for example.

Note that although there may be other types of paper sizes in addition to those indicated in Table 1, these are omitted for the sake of convenience. That is, other types of standard paper sizes may be registered in Table 1. For example, paper sizes of various national standards, such as letter size (US Letter), may be included. Further, paper size tables may be set up for various different countries, such as Japan and the U.S., for example.

TABLE 2

| PAPER THICKNESS TYPE | WEIGHT [g/m²] |
|---|---|
| PLAIN PAPER 1 | 66~80 |
| PLAIN PAPER 2 | 81~100 |
| THIN PAPER | 52~65 |
| MIDDLE THICKNESS PAPER | 101~127 |
| THICK PAPER 1 | 128~169 |
| THICK PAPER 2 | 170~249 |
| THICK PAPER 3 | 250~300 |

Table 2 illustrates an example of a paper thickness table stored in the paper thickness DB 352. The paper thickness table registers various paper thickness types in association with their corresponding paper weights. The paper weight represents paper weight per unit area in grams (grammage). That is, paper within a certain weight range is classified into a predetermined paper thickness type based on the paper thickness table. The paper thickness types may include "plain paper 1", "plain paper 2", "thin paper", "medium thickness paper", "thick paper 1", "thick paper 2", and "thick paper 3", for example.

The image forming apparatus 10 according to the present embodiment implements the same print control with respect to paper within a certain paper weight range, and the paper thickness table defines the paper thickness type for each paper weight range to be subjected to the same print control. Note that the relationship between the paper weight range and the paper thickness type in Table 2 is not fixed and can be dynamically changed to implement more intricate print control, for example. Also, the paper thickness type may vary depending on the image forming apparatus and/or the paper manufacturer, for example. As such, the paper thickness table may include paper thickness types other than those included in the above Table 2.

Also, note that paper of a certain paper thickness type listed in Table 2 does not necessarily have to be within the corresponding paper weight range indicated in Table 2. That is, even if paper is of a certain paper thickness type, the paper may have a paper weight falling outside the corresponding paper weight range indicated in Table 2. This is because paper can take various thicknesses. Thus, in the present embodiment, the corresponding paper thickness type of paper may be determined by identifying a paper thickness type with a paper weight range within a predetermined range of a measured paper weight of the paper, for example.

TABLE 3

| PAPER TYPE | CONVERSION FORMULA | PAPER THICKNESS MEASUREMENT |
|---|---|---|
| PLAIN PAPER | FORMULA 1 | YES |
| POSTCARD | FORMULA 2 | NO |
| ENVELOPE | FORMULA 3 | NO |
| COATED PAPER | FORMULA 4 | YES |
| LABEL PAPER | FORMULA 5 | NO (THICK PAPER 1) |

Table 3 illustrates an example of a conversion formula table stored in the conversion formula DB 353. The conversion formula table registers conversion formulas in association with corresponding paper types. The conversion formula may be a conversion formula for associating paper thickness with paper weight or a conversion formula for calculating paper weight based on paper thickness (or vice versa), the details of which are described below with reference to FIGS. 11-13B. In the conversion formula table, one conversion formula is associated with each paper type. This is because there is a strong correlation between paper thickness and paper weight for each paper type. Thus, if the paper type is known, the appropriate conversion formula to be used may be determined. The paper types listed in Table 3 are paper types that can be intuitively selected by the user, such as paper types that can be recognized by the user based on appearance, for example.

Also, the conversion formula table of Table 3 indicates whether the paper thickness has to be measured for each paper type. That is, in the conversion formula table of Table 3, "YES" is registered in association with a paper type for which the image forming apparatus 10 has to perform paper thickness measurement, and "NO" is registered in association with a paper type for which the image forming apparatus 10 does not have to perform paper thickness measurement. Further, in the case where "NO" is registered, the corresponding paper thickness type may also be registered.

For example, in Table 3, "NO" is registered in association with the paper type "label paper", and because it can be determined that the corresponding paper thickness type of label paper is "thick paper 1" without measuring the thickness of the label paper, the corresponding paper thickness type "thick paper 1" is also registered in association with the paper type "label paper". Note that the relationship between paper type and paper thickness type is described in detail below with reference to FIG. 12.

TABLE 4

| PAPER TYPE | PAPER SIZE |
|---|---|
| PLAIN PAPER | A3~B6 |
| POSTCARD | STANDARD POSTCARD |
|  | REPLY-PAID POSTCARD |
| ENVELOPE | KAKU 2 |
|  | CHOU 3 |
|  | YOUCHOU 3 |
| COATED PAPER | A3~B6 |
| LABEL PAPER | A4 |

Table 4 illustrates an example of a type/size table stored in the type/size DB 354. The type/size table registers paper types in association with corresponding paper sizes. For example, according to the type/size table of Table 4, plain paper may come in standard paper sizes of A3 to B4, and a postcard may come in paper sizes of a standard postcard and a reply-paid postcard. Thus, when a user selects a certain paper type, the image forming apparatus 10 can narrow down the paper size to the corresponding paper sizes associated with the selected paper type.

Note that Table 4 illustrates a simplified example of the type/size table, and the corresponding paper sizes of each paper type are not limited to those listed in Table 4. For example, paper sizes of an envelope may include other various sizes in addition to those listed in Table 4.

<<Control Unit>>

In the following, the functional configuration of the control unit 30 will be described. The paper thickness measurement unit 31 may be implemented by the CPU 41 of FIG. 3 processing instructions, for example. The paper thickness measurement unit 31 applies the appropriate conversion formula to the paper thickness input by the paper thickness detection unit 21*a* to obtain the paper weight of paper. Note that the paper thickness measurement unit 31 may perform some computation or calculation to obtain the paper weight, for example.

The paper size measurement unit 33 may be implemented by the CPU 41 of FIG. 3 processing instructions, for example. The paper size measurement unit 33 measures the paper size of paper based on the paper size input by the paper size detection unit 52*a*. Note that the paper size measurement unit 33 may perform some computation or calculation to measure the paper size, for example.

The paper thickness determination unit 32 may be implemented by the CPU 41 of FIG. 3 processing instructions, for example. The paper thickness determination unit 32 determines the paper thickness type of paper based on the paper type accepted by the paper type input accepting unit 38 and the paper weight obtained by the paper thickness measurement unit 31.

The paper size determination unit 34 may be implemented by the CPU 41 of FIG. 3 processing instructions, for example. The paper size determination unit 34 determines the paper size of paper based on the paper type accepted by the paper type input accepting unit 38 and the paper size measured by the paper size measurement unit 33.

The communication unit 36 may be implemented by the network I/F 43 and the CPU 41 of FIG. 3 processing instructions, for example, and is configured to communicate with an external device. Specifically, for example, the communication unit 36 may transmit the paper type selected by the user and the paper thickness of paper to an external device and acquire paper settings from the external device.

<Operation Procedure>

Figure 8:
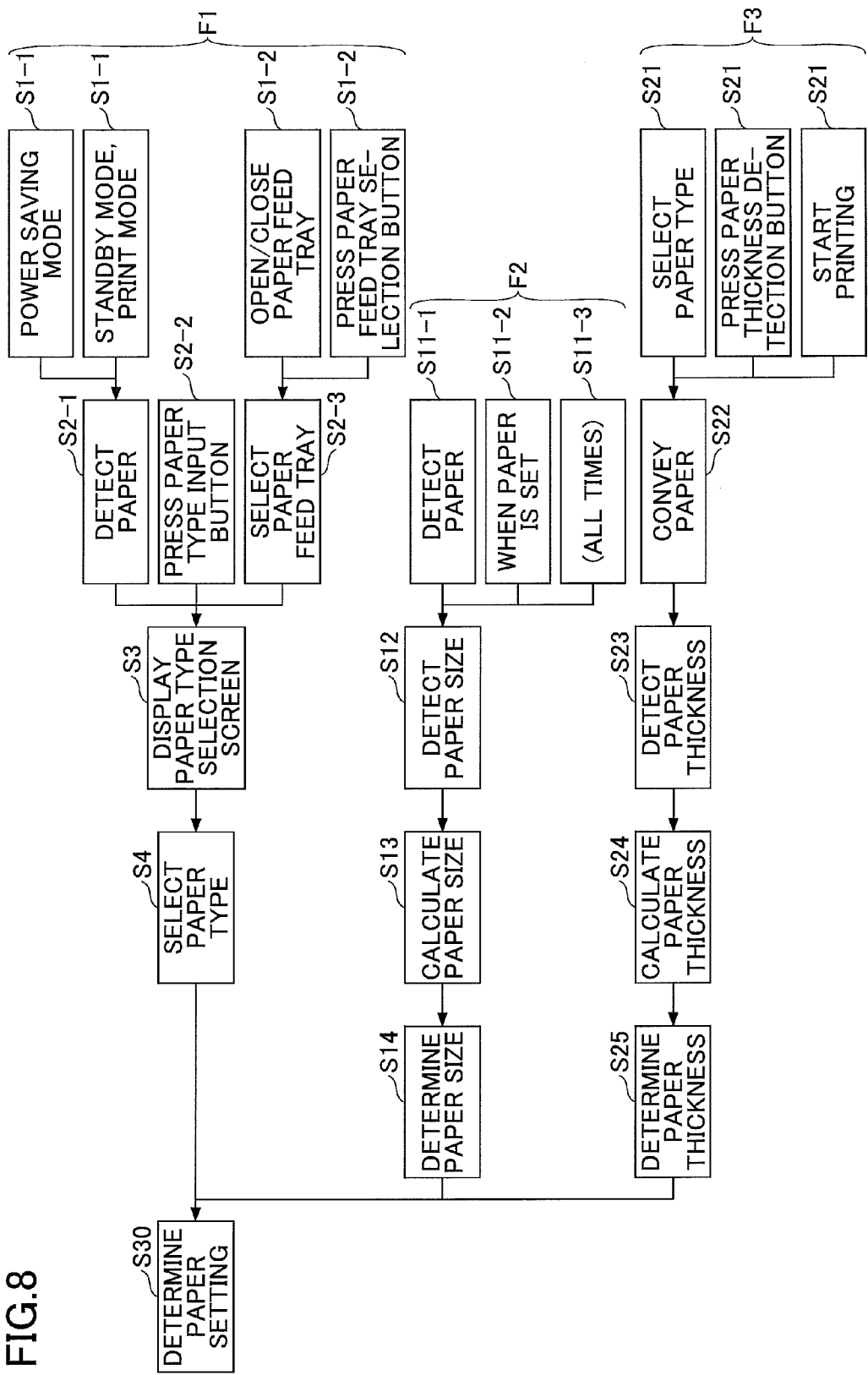
FIG. 8 is a flowchart illustrating an example flow of processes for determining paper settings.

FIG. 8 is a flowchart illustrating an example flow of process operations for determining paper settings. Note that the flowchart of FIG. 8 flows from right to left. The process of FIG. 8 includes three phases. Phase F1 is a process flow including a trigger for a user to select a paper type and process operations for determining the paper type. Phase F2 is a process flow including a trigger for detecting a paper size and process operations for determining the paper size. Phase F3 is a process flow including a trigger for detecting a paper thickness and process operations for determining the paper thickness.

<<Phase F1>>

In step S1-1, the image forming apparatus 10 may be operating in power saving mode, for example. Also, in the case where the image forming apparatus 10 is not in power saving mode, the image forming apparatus 10 may simply be in standby mode or print mode, for example.

In step S2-1, a user may set paper in the paper feed tray 15 or the manual feed tray 17, for example. In response, the paper set detection unit 51*a* detects the paper that has been set in the manual feed tray 17 or the paper feed tray 15.

Alternatively, in step S1-2, the user may open/close the paper feed tray 15, or the user may press a paper feed tray selection button, for example. The paper feed tray selection button is a button displayed on the operation panel 20 for enabling the user to select the paper feed tray 15 or the manual feed tray 17. Note that in addition to the above-described steps S1-1, S1-2, and S2-1, the process operations of Phase F1 may be started by any event that indicates that printing is to be performed by the user.

In step S2-3, the paper set detection unit 51*a* detects the paper feed tray 15 or the manual feed tray 17 being opened/closed by the user or accepts the selection of the paper feed tray 15 or the manual feed tray 17 made by the user via the paper feed tray selection button.

Figure 9:
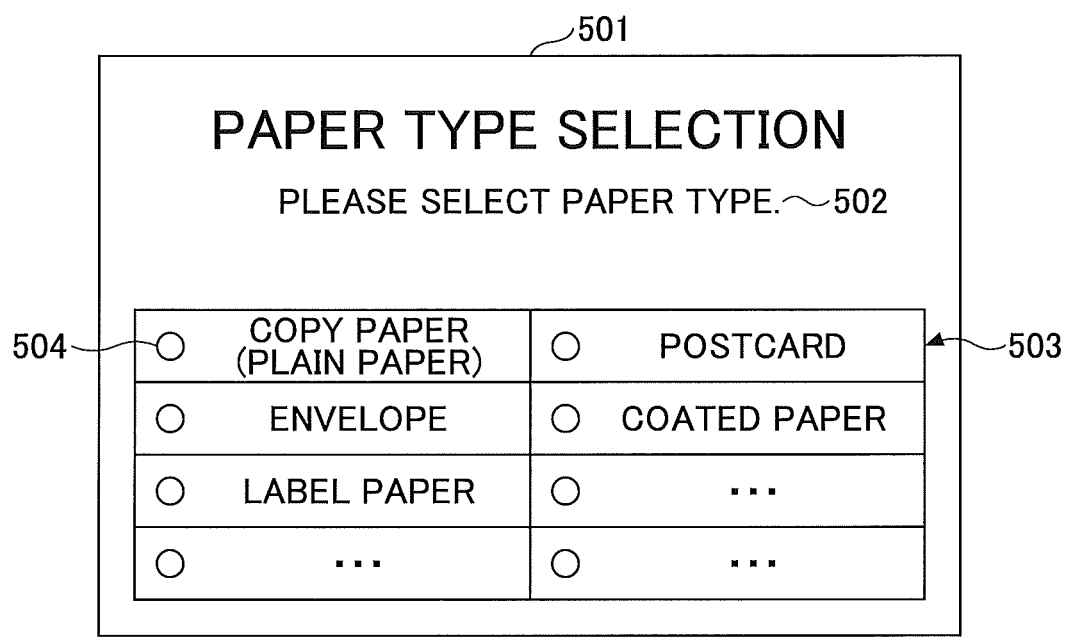
FIG. 9 is a diagram illustrating an example paper type selection screen.

Alternatively, in step S2-2, the user may press a paper type input button, for example. The paper type input button is a button displayed on the operation panel 20 for prompting the operation panel 20 to display a paper type selection screen as illustrated in FIG. 9, for example.

In step S3, the display control unit 37 displays the paper type selection screen on the operation panel 20 in response to an instruction from the control unit 30. That is, the control unit 30 detects the operations of steps S2-1 to S2-3 and controls the operation panel 20 to display the paper type selection screen.

In step S4, the user selects the paper type, and the paper type input accepting unit 38 accepts the paper type selected by the user.

<<Phase F2>>

In step S11-1, the paper set detection unit 51*a* may detect paper set in the manual feed tray 17 or the paper feed tray 15, for example. Alternatively, in step S11-2, the side fences of the paper feed tray 15 or the manual feed tray 17 may be moved, for example. Detection of the paper size may be started in response to such operations, for example.

Alternatively, in some cases, the paper size may always be detected (step S11-3). That is, if paper is set in the manual feed tray 17 or the paper feed tray 15 at all times, the paper size of the paper set therein can be detected at all times. Note that the detection of the paper size may be started either before or after the paper type is selected. However, the appropriate paper size is determined after the paper type is determined.

In step S12, the paper size detection unit 52*a* detects the paper size of the paper placed on the paper feed tray 15 or the manual feed tray 17.

In step S13, the paper size measurement unit 33 measures the vertical and horizontal dimensions of the detected paper size.

In step S14, the paper size determination unit 34 refers to the size/type table of Table 4 and narrows down the possible paper sizes of the paper based on the paper type selected by the user. Then, the paper size determination unit 34 may determine the corresponding paper size from the paper size table of Table 1 by identifying the paper size with vertical and horizontal dimensions within a predetermined range (e.g., ±5 mm) of the vertical and horizontal dimensions of the paper size measured by the paper size measurement unit 33, for example.

<<Phase F3>>

In step S21, a paper type may be selected, a paper thickness detection button may be pressed, or printing may be started, and in response, detection of the paper thickness is started. The paper thickness detection button is a button displayed on the operation panel 20 for enabling the user to arbitrarily detect the paper thickness of paper. In the present embodiment, the paper thickness is detected after the control unit 30 accepts a trigger for conveying paper and conveys paper into the conveying path. In this way, the paper thickness may be measured after one sheet of paper is singled out.

In step S22, the paper thickness measurement unit 31 controls the paper conveying unit 56*a* to convey paper. Note that a mechanism for conveying paper for paper thickness detection may be independent from the paper conveying mechanism for printing, or the paper conveying mechanism for printing may also be used to convey paper for paper thickness detection. Also, note that, as with paper size detection, the paper thickness detection can be started either before or after the selection of the paper type. However, the appropriate paper thickness of paper is determined after the paper type is determined.

In step S23, the paper thickness detection unit 21*a* measures the paper thickness of paper using the paper thickness detection sensor 21 as illustrated in FIG. 6A or 6B, for example.

In step S24, the paper thickness measurement unit 31 measures the paper thickness based on the detection result obtained by the paper thickness detection unit 21*a*.

In step S25, the paper thickness determination unit 32 refers to the conversion formulas registered in Table 3 and reads out the conversion formula associated with the paper type selected by the user. Then, the paper thickness determination unit 32 uses the conversion formula to convert the paper thickness measured by the paper thickness measurement unit 31 into a corresponding paper weight and refers to the paper thickness table of Table 2 to determine the paper thickness type corresponding to the paper weight.

Based on the above-described operations, in step S30, the paper size and the paper thickness type are determined as paper settings, and the control unit 30 sets up these paper settings in the image forming apparatus 10.

<Paper Type Selection Screen>

FIG. 9 is a diagram illustrating an example of the paper type selection screen. The paper type selection screen 501 of FIG. 9 includes a message 502 "Please select paper type." and a paper type list 503. Also, radio buttons 504 are displayed in the paper type list 503, and the user may select a radio button 504 using a finger, for example. The paper type input accepting unit 38 accepts a paper type selection based on the selected radio button 504. Note that paper types displayed on the paper type selection screen 501 may correspond to the paper types listed in Table 4, for example. That is, the paper type selection screen 501 displays paper types that can be visually recognized by the user based on appearance, such as the shape, glossiness, and/or color, of paper, for example. In other words, paper types that cannot be determined without measuring the paper size, the paper thickness, and the like are not displayed on the paper type selection screen 501.

Note that the paper types listed in the paper type list 503 of the paper type selection screen 501 is merely an illustrative example, and other paper types, such as colored paper may also be listed, for example. However, colored paper is treated like plain paper in the image forming apparatus 10 according to the present embodiment. Also, note that when all the paper types cannot be displayed on the operation panel 20 at once, the paper types that are frequently used may be preferentially displayed, and the paper types that cannot be displayed may be displayed on another page, for example. In such case, because paper types that are frequently used vary depending on each user, the display control unit 37 preferably changes the paper types displayed depending on the user. For example, the user may be identified when the user logs into the image forming apparatus 10. The display control unit 37 may statistically determine the paper types frequently used by the user and display the paper types on the operation panel 20 in order of use frequency, for example.

Also, because the paper types commonly used may vary from country to country, for example, use frequency of paper types may vary depending on each country. Thus, in one preferred embodiment, the display control unit 37 may be configured to determine the paper types frequently used in each country and prioritize display of the paper types frequently used a given country on the operation panel 20. In this case, the user may set the country in which the image forming apparatus 10 is used (or the country may be determined based on position information such as GPS), and the display control unit 37 may display the paper types associated with the country.

Note that although the paper type selection screen 501 of FIG. 9 is described as being displayed on the operation panel 20, the paper type selection screen 501 may also be displayed on a display of a PC (Personal Computer) connected to the image forming apparatus 10 via a network, for example. Even when the paper type selection screen 501 is displayed on the PC, the control unit 30 can similarly determine the paper size and the paper thickness type in the manner described above, for example.

<Paper Size and Paper Thickness Type Determination>

Figure 10A:
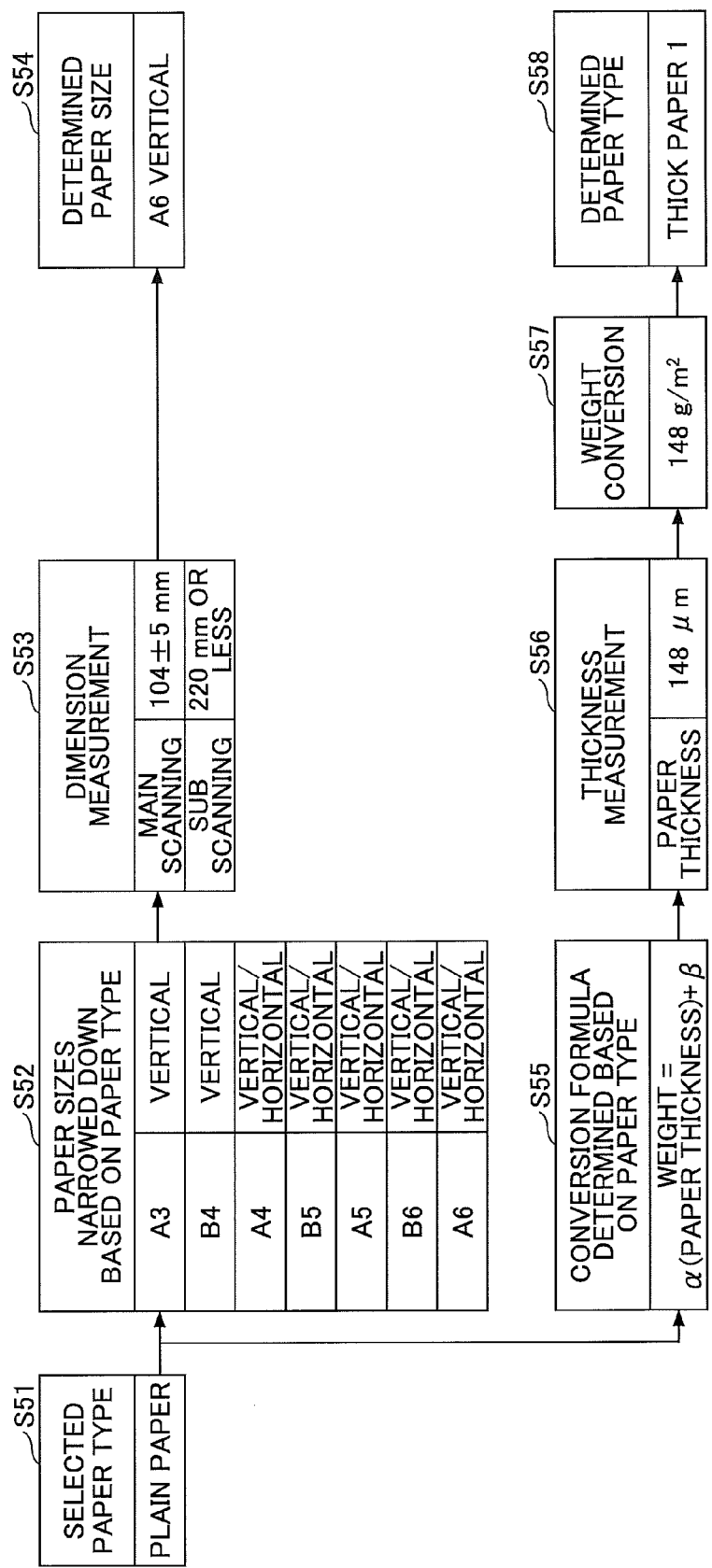
FIGS. 10A and 10B are diagrams schematically illustrating processes of determining a paper size and a paper thickness type.

FIG. 10A is a diagram schematically illustrating process operations for determining the paper size and the paper thickness type according to the present embodiment.

In step S51, the user selects a paper type via the paper type selection screen 501, for example. In the example described below, it is assumed that "plain paper" is selected by the user.

In step S52, paper sizes of the paper used are narrowed down based on the paper type selected by the user. According to the type/size table of Table 4, paper sizes of plain paper include A3 to A6 (i.e., A3, B4, A4, B5, A5, B6, and A6).

In step S53, the paper size measurement unit 33 measures the paper size of the paper used. In the present example, it is assumed that the vertical and horizontal dimensions (paper size) measured by the paper size measurement unit 33 are 104±5 mm in the main scanning direction (vertical) and 220 mm or less in the sub scanning direction (horizontal).

In step S54, the paper size determination unit 34 determines the paper size corresponding to the vertical and horizontal dimensions measured by the paper size measurement unit 33. In the present example, the paper size determination unit 34 refers to the paper size table of Table 1 to determine the corresponding paper size of paper having a width (horizontal dimension) of 220 mm or less and a length (vertical dimension) of 104±5 mm. Among the paper sizes A3 to A6, the corresponding paper size of paper having the above dimensions would be A6 vertical.

As described above, by having the user select a paper type, paper sizes of the paper used can be narrowed down based on the paper type selected by the user. Also, in the present embodiment, the paper sizes are narrowed down based on a selection of a paper type that can be intuitively determined by the user, and in this way, the paper size that cannot be easily determined by the user may be accurately determined based on paper size measurements of the paper size detection sensor 52, which may be implemented by a relatively simple sensor.

Then, in step S55, the paper thickness determination unit 32 reads out a conversion formula associated with the selected paper type. In the present example, because the selected paper type is "plain paper", the paper thickness determination unit 32 reads out "conversion formula 1" that is associated with "plain paper" in Table 3.

In step S56, the paper thickness measurement unit 31 measures the paper thickness. In the present example, it is assumed that the measured paper thickness is 148 μm.

In step S57, the paper thickness determination unit 32 plugs in the paper thickness 148 μm into the conversion formula 1 and converts the paper thickness into a corresponding paper weight. In the present example, it is assumed that the paper thickness 148 μm is converted into a paper weight of 148 $g/m^2$.

In step S58, the paper thickness determination unit 32 refers to the paper thickness table of Table 2 to determine the paper thickness type for the paper weight of 148 $g/m^2$. That is, based on Table 2, the paper thickness determination unit 32 determines that the paper thickness type is "thick paper 1".

As can be appreciated from the above, even though paper of various types that are in similar paper sizes may exist, by having the user select a paper type, paper sizes of the paper used may be narrowed down based on the paper type selected by the user, and in this way, the corresponding paper size may be more easily determined based on paper size measurements. For example, the paper size of A6 vertical (105 mm×148 mm) and the paper size of a standard postcard (100 mm×148 mm) only have a vertical dimension difference of 5 mm. Thus, if the paper type is not specified, the paper size detection unit 52a may have to distinguish between 100 mm and 105 mm in measuring the paper size. However, a measurement difference of 5 mm may be within an error range of the paper size detection unit 52a. That is, an error of about 5 mm can easily occur due to detection error of the paper size detection unit 52a and/or deviations of paper set in the manual feed tray 17 or the paper feed tray 15 by the user, for example.

In this respect, according to an aspect of the present embodiment, by having the user select a paper type, paper sizes of plain paper can be distinguished from paper sizes of a postcard, for example. Thus, even if the paper size measurement has a detection error of ±5 mm, by having the user select the paper type "plain paper", the corresponding paper size may be determined to be A6 based on the selected paper type and the paper size measurements, for example.

Note that the paper thickness type of the paper used may be determined in a similar manner based on the selected paper type and a paper thickness measurement. That is, in the image forming apparatus 10, the paper weight [$g/m^2$] is used as an indicator of paper thickness. However, expensive sensing technology may be required to accurately measure the paper weight in the image forming apparatus 10. As such, in the image forming apparatus 10 according to the present embodiment, information other than the paper weight (e.g., paper thickness, transmitted light quantity) is detected and converted into a corresponding paper weight. However, because information other than paper weight (e.g., paper thickness) is detected and converted into paper weight, the converted paper weight may not always be accurate.

For example, plain paper and coated paper having the same thickness may exit. However, plain paper and coated paper having the same thickness may have varying paper weight ranges. For example, plain paper with a thickness of 128 um may have a paper weight (grammage) within a range from 130 to 150 $g/m^2$ and coated paper with a thickness of 128 um may have a paper weight (grammage) within a range from 140 to 180 $g/m^2$. Thus, if the paper type is not specified, even when the paper thickness is measured and converted into paper weight, the converted paper weight may have a range from 130 to 180 $g/m^2$. According to the paper thickness table of Table 2, the paper weight range from 130 to 180 $g/m^2$ is included in the paper weight ranges of "thick paper 1" and "thick paper 2". Thus, in this case, the paper thickness type cannot be unambiguously determined by simply converting the measured paper thickness to paper weight.

In this respect, according to an aspect of the present embodiment, by having the user select a paper type, the relationship between paper weight and paper thickness may be narrowed down. For example, in the above case, if "plain paper" is selected as the paper type, the paper thickness type can be unambiguously determined as "thick paper 1".

Also, note that when the image forming apparatus 10 cannot narrow down the paper size and/or the paper thickness type to one paper size and/or one paper thickness type, the image forming apparatus 10 may display multiple paper sizes and/or paper thickness types as candidates and enable the user to select the appropriate paper size and/or paper thickness type. For example, in the case of an envelope, both "Youchou 3" and "Chou 3" are 120 mm×235 mm in size, and as such, the paper size cannot be determined based on dimension measurements (paper size measurements) of the envelope. Also, in a case where the thickness measurement of paper is 100 um, for example, depending on the paper type, both "middle thickness paper" and "thick paper 1" can be the corresponding paper type, and the image forming apparatus 10 may not be able to unambiguously determine the paper thickness type of the paper. In such case, the image forming apparatus 10 may display multiple paper sizes and/or paper thickness types as candidates and accept a selection of the appropriate paper size and/or paper thickness type from the user, for example. Also, in some embodiments, the image forming apparatus 10 may select one of a plurality of candidates based on priority order information set in advance by the user, for example. Further, in some embodiments, the image forming apparatus 10 may display the paper size and/or the paper thickness type selected by the user, and request the user to confirm whether the selection has been correctly made, for example.

Figure 10B:
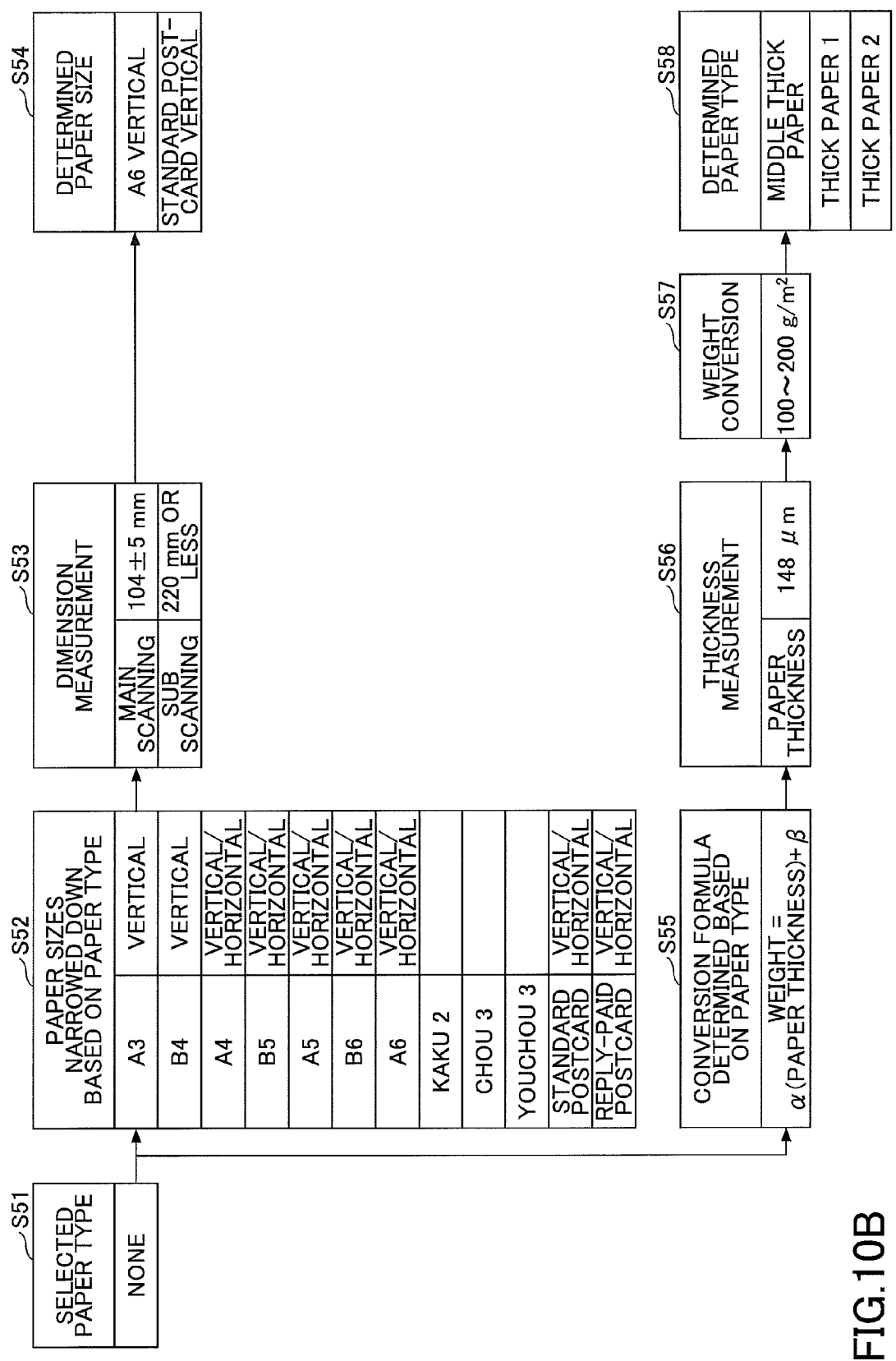

FIG. 10B is a diagram schematically illustrating process operations for determining the paper size and the paper thickness type in a case where the paper type is not selected by the user. That is, FIG. 10B illustrates a comparative example with respect to the present embodiment as illustrated in FIG. 10A.

In step S51, no paper type is selected by the user in the example of FIG. 10B.

In step S52, because no paper type is selected, all paper sizes of all paper types that can be used in the image forming apparatus 10 to print an image become candidates for the paper size setting.

In steps S53 and S54, the paper size measurement unit 33 measures the vertical and horizontal dimensions of the paper to be "104±5 mm" and "220 mm or less", respectively, and the paper size determining unit 34 determines "A6 vertical" and "standard postcard vertical" as paper sizes having a horizontal dimension of 220 mm or less and a vertical dimension of 104±5 mm. That is, in the present example, the paper size cannot be narrowed down to one paper size.

In step S55, because the paper type is not selected, the paper thickness determination unit 32 has to use all conversion formulas (conversion formulas for all paper types that can take the measured thickness of 148 μm).

In steps S56 and S57, the paper thickness measurement of 148 μm is obtained, and the paper thickness is converted into a corresponding paper weight. In the present example, because the conversion formula is not narrowed down to one conversion formula, the corresponding paper weight for a paper thickness of 148 μm is determined to be within a range from 100 to 200 g/m².

As a result, in steps S58, three paper thickness types including "medium thickness paper", "thick paper 1", and "thick paper 2" are determined to be corresponding paper thickness types for the above paper weight range of 100 to 200 g/m². That is, the paper thickness type cannot be narrowed down to one paper thickness type.

As described above, in the image forming apparatus 10 according to the present embodiment, the user selects a paper type, and in this way, the paper size and the paper thickness type may be narrowed down based on the selected paper type to thereby facilitate determination of the appropriate paper size and paper thickness type, for example.

<Conversion Formula>

Figure 11:
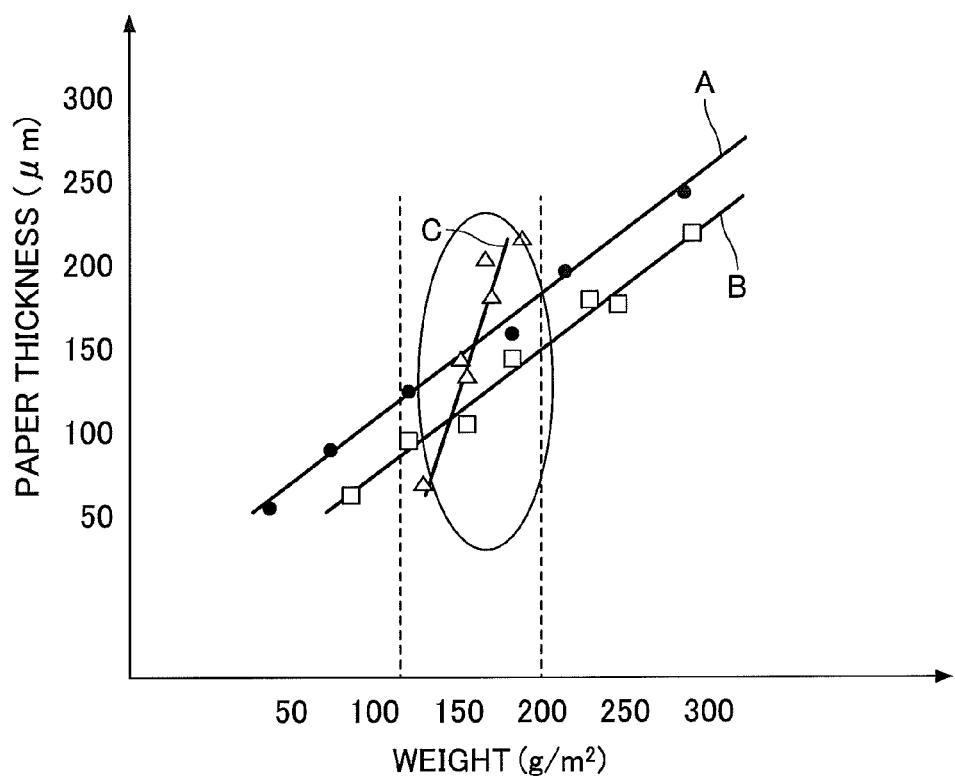
FIG. 11 is a graph indicating a relationship between paper thickness and paper weight for each paper type.

The conversion formula will be described below with reference to FIGS. 11-13B. FIG. 11 is a graph representing the relationship between paper thickness and paper weight for different paper types including paper type A (plain paper), paper type B (coated paper), and paper type C (label paper). As can be appreciated from FIG. 11, each paper type exhibits a characteristic relationship between paper thickness and paper weight. For example, the relationship between paper thickness and paper weight for paper type A can be approximated by a straight line A, the relationship between paper thickness and paper weight for paper type B can be approximated by a straight line B, and the relationship between paper thickness and paper weight for paper type C can be approximated by a straight line C. For example, because the paper type A is plain paper, the paper type B is coated paper, and the paper type C is label paper, each of the above paper types exhibit a different relationship between paper thickness and paper weight.

If the paper thickness determination unit 32 were to determine the paper thickness type based solely on paper thickness, such as 150 μm, for example, a corresponding paper weight obtained by converting the paper thickness into paper weight would have a substantially wide variation range because all three of the paper types A to C can have a paper thickness of 150 μm. Thus, if the paper type is not selected, even if the paper thickness measurement unit 31 measures the paper thickness, the image forming apparatus 10 cannot automatically determine the corresponding paper thickness type by converting the paper thickness into paper weight.

On the other hand, if the user selects the paper type C, for example, the corresponding paper weight may be almost unambiguously determined by converting the paper thickness into paper weight, and as such, the corresponding paper thickness type can be almost unambiguously determined. Note that although the paper weight corresponding to the paper thickness can be unambiguously determined based on the conversion formula associated with the selected paper type, an error may be included in linearly approximating the relationship between paper thickness and paper weight by a regression line, for example, and as such, the expression "almost unambiguously" is used above.

Note that although the correlations between paper thickness and paper weight for the paper types A to C are described above, other paper types also exhibit strong correlations between paper thickness and paper weight. As such, a conversion formula for each paper type may be created by the paper manufacturer, for example, by measuring the relationship between paper thickness and paper weight for the same paper type and linearly approximating the relationship using, for example, the least squares method as indicated below.

Paper Weight=α×Paper Thickness+β

Note that α represents the slope of the straight line and β represents the Y intercept. Note that conversion of the paper thickness to paper weight may be performed using a conversion formula as described above, or the conversion may be performed using a table, for example.

In this way, the user can select a paper type that can be intuitively determined, and the image forming apparatus 10 can determine the paper thickness (paper weight) that cannot be easily determined by the user. According to an aspect of the present embodiment, the image forming apparatus 10 may only require a relatively simple paper thickness detection sensor 21 to determine the paper thickness, and in this way, a cost increase of the image forming apparatus 10 may be prevented, for example.

Figure 12:
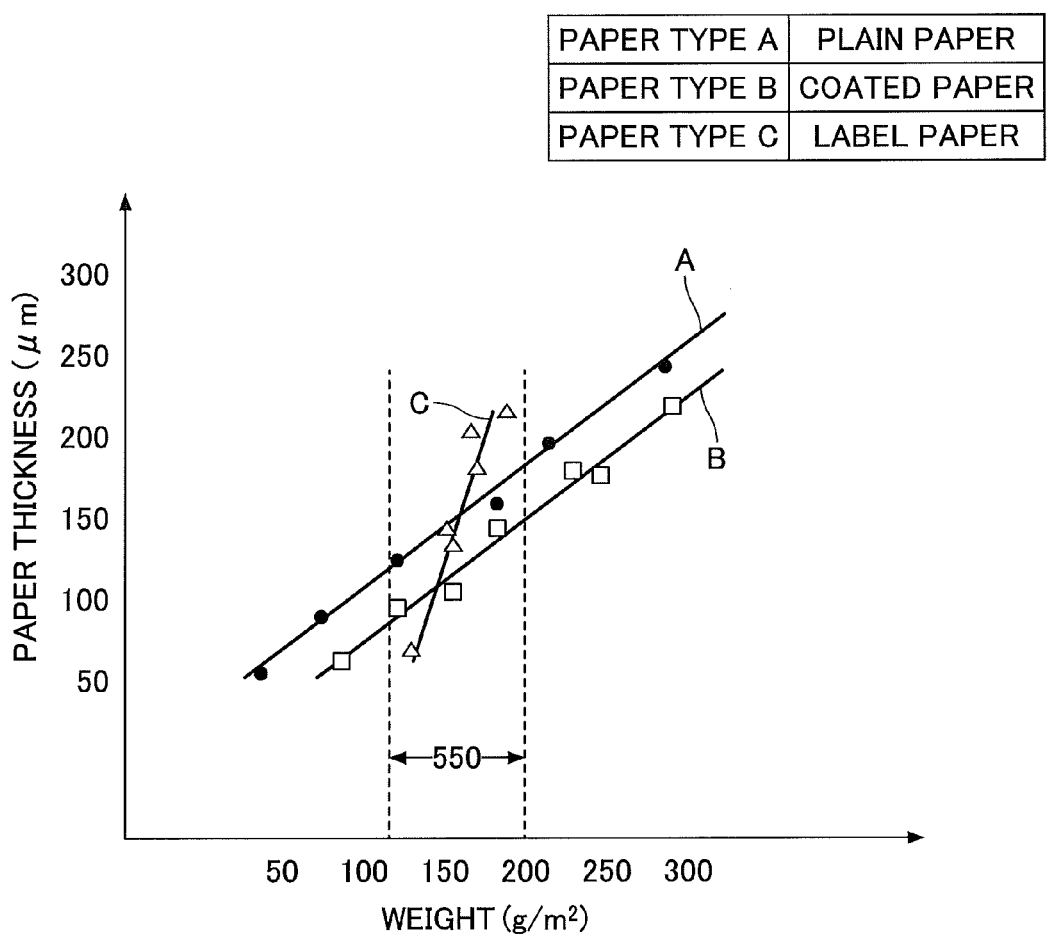
FIG. 12 is graph indicating a relationship between paper thickness and paper weight for a paper type having a paper thickness that can be determined without measurement.

FIG. 12 is a graph representing the relationship between paper thickness and paper weight for a paper type that can only be classified into one paper thickness type (i.e., the corresponding paper thickness type can be unambiguously determined based on the paper type). With certain paper types, such as the paper type C (label paper), for example, the corresponding paper thickness type can be determined once the paper type is determined (i.e., without considering paper size/thickness measurements). As can be appreciated from FIG. 12, although paper type C can be in various thicknesses (paper weights) within a certain range 550, the range 550 of the paper weight of paper type C falls within the paper weight range of one paper thickness type. For example, as can be appreciated from the paper thickness table of Table 2, each paper thickness type has a predetermined paper weight range. The range 550 of the paper weight of paper type C in FIG. 12 is approximately 128 to 169 g/m², which substantially coincides with the paper weight range of "thick paper 1" in Table 2.

Thus, when the user selects paper type C, the same paper thickness type (thick paper 1) will always be determined to be the corresponding paper thickness type regardless of the measured paper thickness and the corresponding paper weight. As can be appreciated from the above, depending on the paper type selected by the user, the paper thickness may not have to be measured. As such, the paper thickness measurement unit 31 according to the present embodiment does not measure the paper thickness when a predetermined paper type is selected.

In this way, depending on the paper type selected by the user, one sheet of paper set in the manual feed tray 17 or the paper feed tray 15 may not have to be drawn in to have the paper thickness measured, and the operation time from the start to completion of setting up paper settings may be reduced, for example.

On the other hand, with respect to paper types for which the corresponding paper thickness type (paper thickness setting) cannot be determined even when the paper type is selected, the paper thickness measurement unit 31 performs paper thickness measurement, converts the resulting paper thickness measurement into paper weight based on the selected paper type, and determines the corresponding paper thickness setting.

Note that whether to measure the paper thickness is determined in advance with respect to each paper type. In the present embodiment, such information is registered in the conversion formula of Table 3 stored in the conversion formula DB 353. However, in other embodiments, an independent database registering information indicating whether paper thickness measurement is necessary for each paper type may be provided, for example.

Figures 13A, 13B:
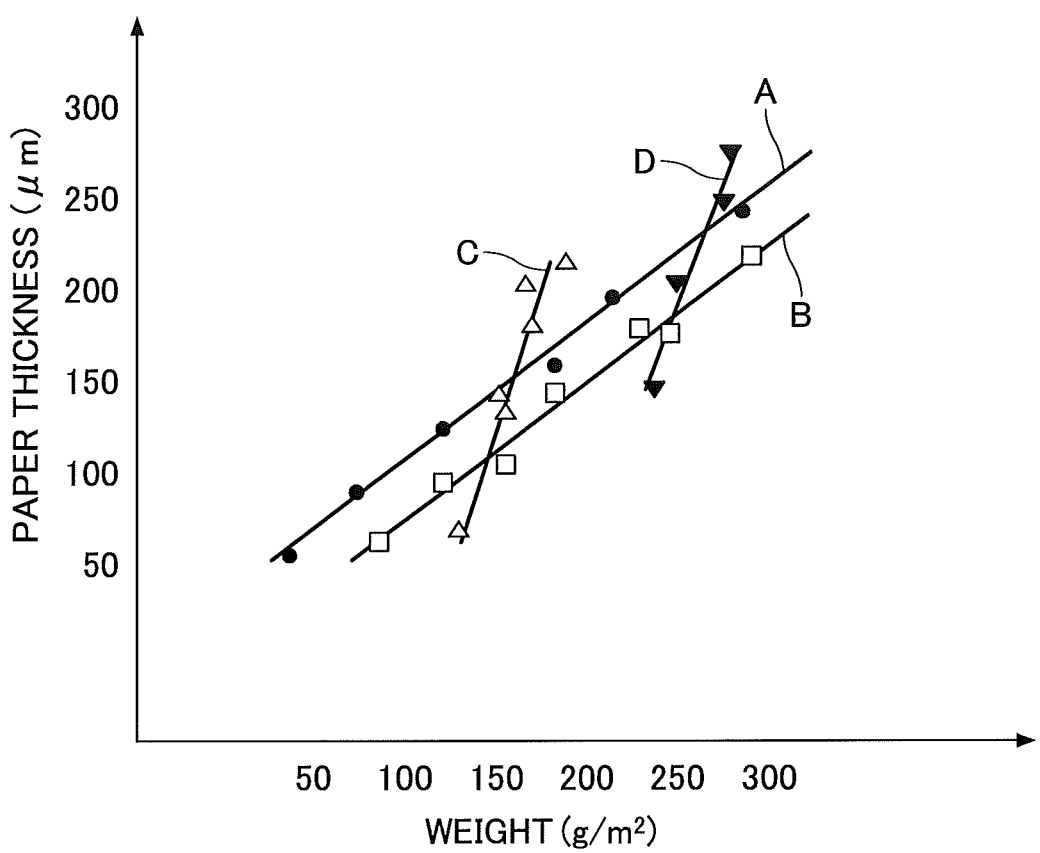
FIGS. 13A and 13B are diagrams indicating correlation coefficients of conversion formulas.

FIGS. 13A and 13B are diagrams for explaining the correlation coefficient of the conversion formula. In the present embodiment, the paper thickness is converted into paper weight using a conversion formula, and the paper thickness type is determined based on the paper weight. Thus, the conversion accuracy for converting paper thickness to paper weight is preferably improved in order to improve accuracy in determining the paper thickness type.

When the manufacturer of the image forming apparatus 10 or some other person in charge of setting up the conversion formulas linearly approximates the relationship between paper thickness and paper weight for various paper types without selecting the paper type, a correlation coefficient R of the correlation between paper thickness and paper weight may be less than 0.7. The correlation coefficient R is defined by the following formula.

$$R = Sxy/\sqrt{-(SxxSyy)}$$

In the above formula, Sxx represents the variance of the x component (paper weight), Syy represents the variance of the y component (paper thickness), Sxy represents the product of the difference between the average of the x components and each x component and the difference between the average of the y components and each y component added up by the number of measurement points. R takes a value within a range from −1 to 1, the closer the value R is to 1, the stronger the positive correlation, and the closer the value R is to −1, the stronger the negative correlation.

Generally, when the correlation coefficient R is less than 0.7, the positive correlation is considered to be low. In this case, when converting from paper thickness to paper weight, there is a risk that the paper thickness type cannot be correctly determined.

In other words, when a user selects a paper type displayed on the paper type selection screen 501, if the correlation between paper thickness and paper weight for the selected paper type has a correlation coefficient R of at least 0.7, the paper thickness type may more likely be correctly determined by converting paper thickness to paper weight. Therefore, in the present embodiment, the paper type selection screen 501 is configured to display paper types associated with conversion formulas having a correlation coefficient R of at least 0.7.

Also, in order to improve accuracy in determining the paper thickness type, the conversion formulas may be configured to have an even stronger correlation between paper thickness and paper weight. For example, a correlation coefficient R of at least 0.9 may be desirable. It has been experimentally confirmed that a correlation coefficient R between paper thickness and paper weight of at least 0.9 can be achieved for paper types having several levels of thicknesses, such as coated paper and plain paper. Thus, with respect to such paper types, the paper thickness type can be determined with even higher accuracy by converting paper thickness to paper weight.

Note that to improve accuracy in determining the paper thickness type, the measurement accuracy of the paper thickness has to be high. However, when measuring the paper thickness, the measurement accuracy may be influenced by vibration of the image forming apparatus 10 and/or operation of the paper thickness detection mechanism 55 at the time of measuring the paper thickness. For example, when measuring the paper thickness during operation of the image forming apparatus 10, influences of the operation of the paper thickness detection mechanism 55 may be reflected in the measurement result to increase measurement error. In this respect, when drawing in one sheet of paper to measure the paper thickness, the paper conveying operation is preferably stopped at the time of measurement. By stopping the paper conveying operation when the paper thickness is measured, the measurement accuracy of the paper thickness can be improved, for example.

Also, note that in some cases, merely stopping the paper conveying operation may not be adequate for achieving the desired measurement accuracy. When the paper thickness detection mechanism 55 draws in paper with a roller and stops the paper to measure its paper thickness, the rotation angle (phase) of the roller at the time the paper is stopped may not be known. Although the radius of the roller is substantially uniform, there may be variations in the radius at the micro level. In other words, the roller is not a perfect circle, and the variations in the radius may cause an error in the measurement result of the paper thickness, for example. Thus, in a preferred embodiment, the paper thickness measurement unit 31 monitors the output of the paper thickness detection sensor 21 while changing the rotation angle of the roller in a state where no paper is introduced and acquires a zero point. In this way, the relationship between the phase and the zero point can be determined. Thus, when actually measuring the paper thickness, the paper thickness can be corrected by the phase, for example.

<Operation Procedure>

Figure 14:
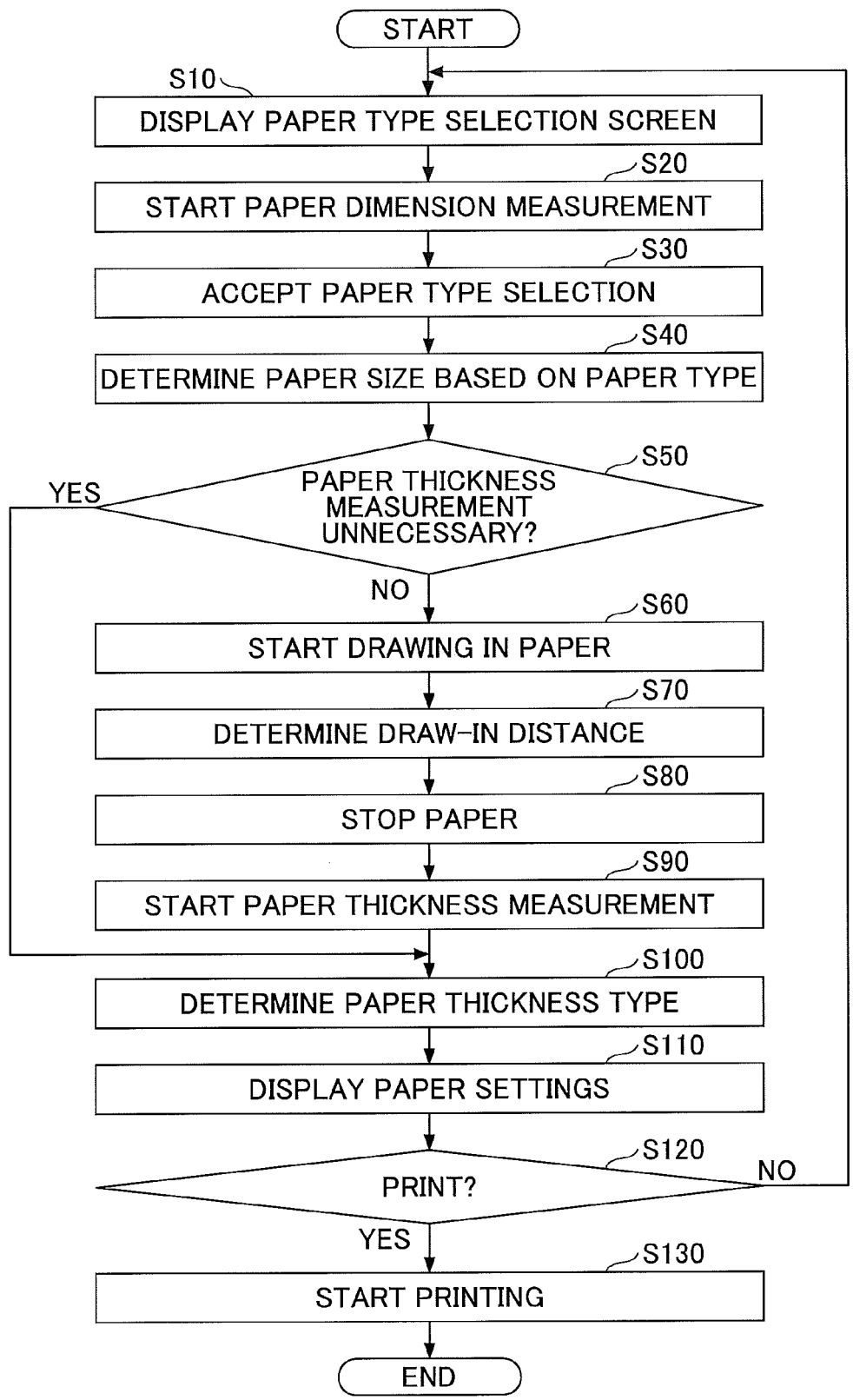
FIG. 14 is a flowchart illustrating an example process implemented by the image forming apparatus for setting up paper settings.

FIG. 14 is a flowchart illustrating an example process of the image forming apparatus 10 for setting up paper settings. The process of FIG. 14 may be started when the user sets paper in the manual feed tray 17 or the paper feed tray 15, selects the paper feed tray 15, or presses the paper type input button, for example.

In response to at least one of the above user operations, the display control unit 37 displays the paper type selection screen 501 on the operation panel 20 (step S10).

Then, the paper size measurement unit 33 starts measuring the dimensions of the paper (step S20). In this way, dimension measurements of the paper may already be obtained by the time the user selects the paper type.

Then, the paper type input accepting unit 38 accepts a selection of a paper type (step S30).

The paper size determination unit 34 determines the paper size based on the selected paper type (step S40). That is, the paper size determination unit 34 refers to the type/size table of Table 4 to read out paper sizes associated with the paper type selected by the user. Then, referring to the paper size table of Table 1, the paper size determination unit 34 may determine a paper size with dimensions falling within a predetermined range of the measured dimensions from among the paper sizes associated with the selected paper type, for example. In this case, the paper size determination unit 34 may find a plurality of paper sizes with dimensions falling within a predetermined range of the measured dimensions. Further, in some embodiments, the paper size determination unit 34 may determine a paper size with dimensions closest to the measured dimensions from the paper size table of Table 1 stored in the paper size DB 351. In this case, one paper size may be determined as the paper size setting.

Then, the paper thickness determination unit 32 determines whether the paper type selected by the user is a paper type that does not require paper thickness measurement (step S50). That is, the paper thickness determination unit 32 refers to the conversion formula table of Table 3 to determine whether "NO" (indicating that paper thickness measurement is not necessary) is registered in association with the paper type selected by the user.

If a positive determination (YES) is made in step S50, the process proceeds to step S100. In this case, the paper thickness determination unit 32 reads out the paper thickness type registered in association with the paper type selected by the user in the conversion formula table (step S100).

If a negative determination (NO) is made in step S50, the paper thickness measurement unit 31 of the control unit 30 controls the paper conveying unit 56*a* to start drawing in paper (step S60).

Then, the paper thickness measurement unit 31 reads out the paper draw-in distance from the storage unit 35 (step S70). Note that the draw-in distance of the paper is set up in advance in the paper thickness detection mechanism 55. In this way, the paper thickness detection mechanism 55 may prevent paper that has been drawn in from colliding with paper being conveyed on the conveying path 22. For example, the paper to be subjected to paper thickness measurement may be drawn in by a distance of several centimeters. Also, note that in some embodiments, step S70 may be performed before step S60, for example.

Then, the paper thickness measurement unit 31 stops the paper conveying operation of the paper conveying unit 56*a* (step S80). By stopping the paper conveying operation, the paper thickness may be more accurately measured, for example.

Then, the paper thickness measurement unit 31 measures the paper thickness (step S90). Note that when a bundle of sheets of paper is set, the paper thickness measurement may only be performed with respect to the first sheet of paper.

Then, the paper thickness determination unit 32 determines the paper thickness type (step S100). That is, the paper thickness determination unit 32 reads out the conversion formula associated with the paper type selected by the user from the conversion formula table of Table 3, plugs in the measured paper thickness into the conversion formula, and converts the measured paper thickness into a corresponding paper weight. Then, the paper thickness determination unit 32 refers to the paper thickness table of Table 2 to determine a corresponding paper thickness type with a paper weight range including the above converted paper weight as the paper thickness type setting.

Figure 15:
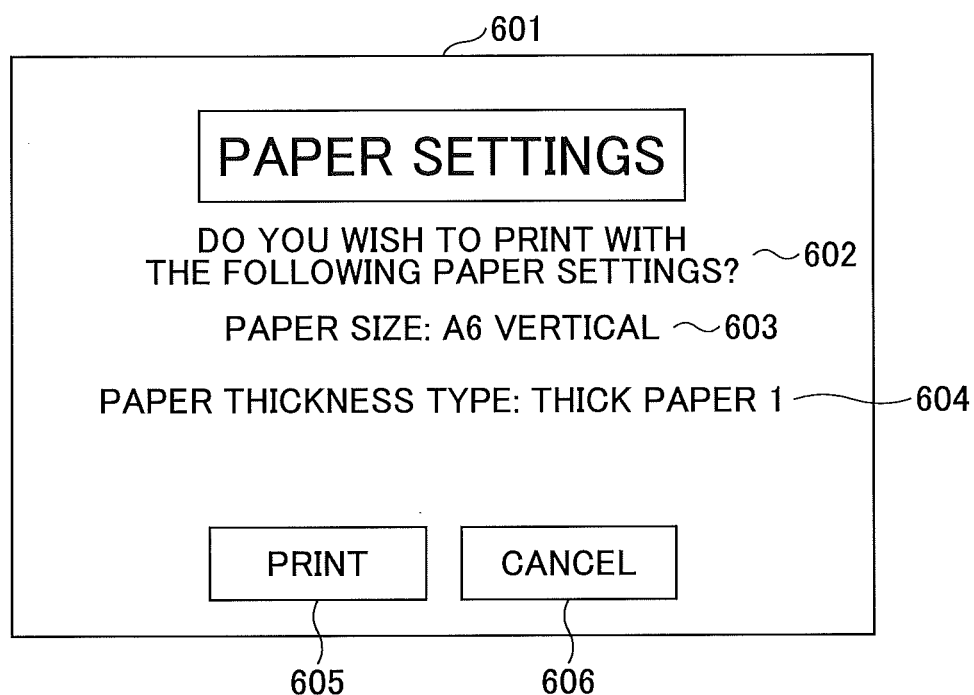
FIG. 15 is a diagram illustrating an example paper setting inquiry screen.

The display control unit 37 displays the paper settings (paper size and paper thickness type) that have been determined in the above-described manner on the operation panel 20, for example (step S110). Specifically, the display control unit 37 displays a paper setting inquiry screen on the operation panel 20 that indicates the determined paper size and paper thickness type and asks the user whether to execute printing using the indicated paper settings. FIG. 15 illustrates an example of the paper setting inquiry screen.

The operation panel 20 displaying the paper setting inquiry screen accepts a user input indicating whether to execute printing and determines whether the user has input an instruction to execute printing (step S120).

If the user inputs an instruction to execute printing, the image forming apparatus 10 starts printing (step S130). If the user does not input an instruction to execute printing, the process returns to step S10 and restarts the process from displaying the paper type selection screen.

Note that in the present embodiment, the paper thickness measurement is performed in order to narrow down the paper thickness type. However, in addition to such paper thickness measurement according to the present embodiment, paper thickness measurement may also be performed for determining whether the paper thickness is within a normal range (paper thickness measurement for error detection), for example. That is, the paper thickness measurement may be performed in order to exclude extremely thick paper or extremely thin paper from being used for printing. In this case, when the measured paper thickness falls outside the normal range, the image forming apparatus 10 may signal an error and stop paper conveying operations. For example, such paper thickness measurement for error detection may be performed in order to detect a case where multiple sheets of paper overlapping with one another are conveyed or a case where different paper types are mixed together, for example. Unlike the paper thickness measurement according to the present embodiment as described above, the paper thickness measurement for error detection may be performed without stopping the paper conveying operation. Also, the paper thickness measurement for error detection is carried out irrespective of the information relating to whether paper thickness measurement is necessary ("YES" or "NO") registered in the conversion formula table (Table 3). Also, when a bundle of sheets of paper is set, the paper thickness measurement for error detection is performed with respect to each sheet of paper including the second and subsequent sheets. Note that in the present embodiment, the user may be able to arbitrarily configure the image forming apparatus 10 to perform such paper thickness measurement for error detection or refrain from performing such paper thickness measurement.

FIG. 15 illustrates an example paper setting inquiry screen 601. The paper setting inquiry screen 601 of FIG. 15 includes a message 602 "Do you wish to print with the following paper settings?", a paper size display field 603, a paper thickness type display field 604, a print execution button 605, and a cancel button 606. The user may check the paper size and the paper thickness type and press the print execution button 605 or the cancel button 606.

Note that paper sizes may include irregular paper sizes as well as standard paper sizes (e.g., Youchou 3 envelope, Chou 3 envelope). As such, the determined paper size may not always be accurate. Also, because the paper weight is a value converted from the paper thickness, the determined paper thickness type may not always be accurate. Thus, the image forming apparatus 10 preferably prompts the user to confirm the accuracy of the paper settings that have been determined. In the present embodiment, printing is executed when the print execution button 605 is pressed by the user, but printing is not executed when the cancel button 606 is pressed by the user. In this way, the user can execute printing after confirming the accuracy of the determined paper settings.

Note that in some embodiments, the display control unit 37 may display a plurality of paper sizes and/or a plurality of paper thickness types. For example, when the paper size determination unit 34 cannot narrow down the paper size to one unique paper size, the display control unit 37 may display a plurality of candidate paper sizes, and the user can select the appropriate paper size therefrom. In the present embodiment, the paper thickness determination unit 32 can narrow down the paper thickness type to one paper thickness type. However, for example, in a case where a plurality of conversion formulas are associated with one paper type, the paper thickness determination 32 may determine a plurality of paper thickness types as candidates. In such a case, the user may select the appropriate paper thickness type from the candidate paper thickness types, for example.

Also, in some embodiments, the paper size display field 603 may be configured display multiple paper sizes in a drop-down list on the paper setting inquiry screen 601, and the user may be able to select a given paper size from the paper sizes listed in the drop-down list, for example. Likewise, the paper thickness type display field 604 may be configured to display multiple paper thickness types in a drop-down list, and the user may be able to select a given paper thickness type from the paper thickness types listed in the drop-down list, for example. In this way, when one or more of the paper settings determined by the image forming apparatus 10 are incorrect, the user can easily correct the paper settings.

<Control Based on Paper Settings>

Figure 16A:
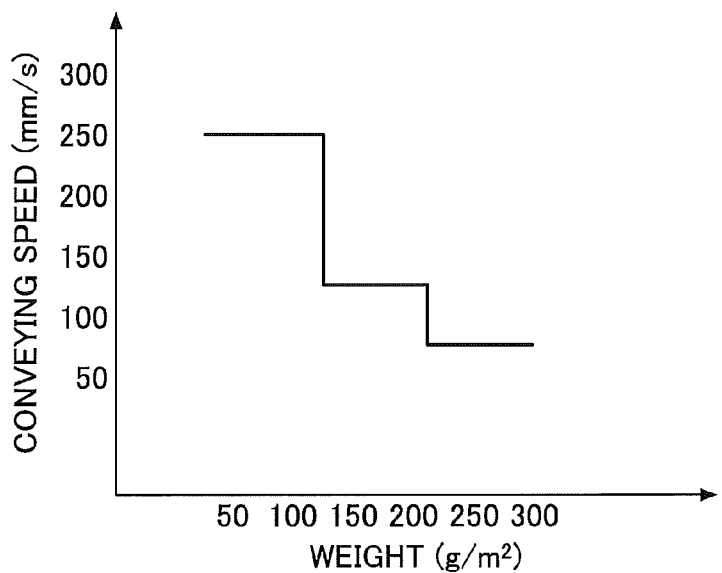
FIGS. 16A-16C are graphs illustrating example controls implemented in the image forming apparatus according to paper settings.
Figure 16B:
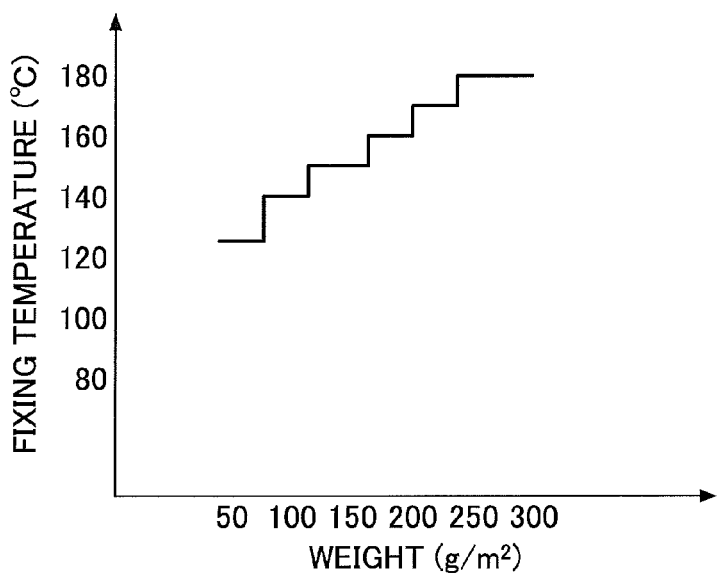
Figure 16C:
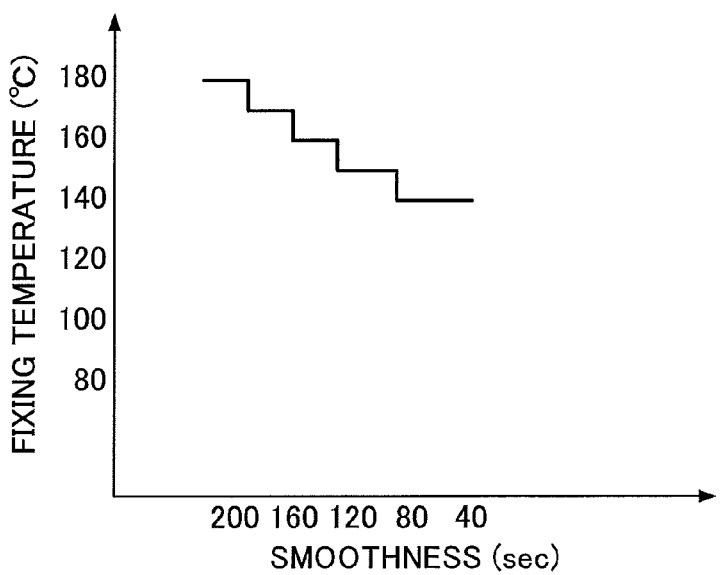

FIGS. 16A-16C are diagrams illustrating example controls implemented in the image forming apparatus 10 based on the paper settings. FIG. 16A schematically illustrates the relationship between the paper thickness type and the conveying speed. In 5. FIG. 16A, the image forming apparatus 10 controls the conveying speed to decrease in a stepwise manner as the paper weight of the paper thickness type increases. Note that paper having a heavy weight means that the paper is thick, and heat of the fixing device 16 cannot be easily transmitted through such thick paper. Thus, as the paper weight increases, the conveying speed is controlled to be slower so that toner can be adequately fixed on the paper. Also, paper having a heavy weight means that the paper is hard and its edges are easily bent. For this reason, the conveying speed is lowered to suppress deformation of the paper. Note that a secondary transfer bias voltage and the like may also be controlled, for example. FIG. 16B schematically illustrates the relationship between the paper thickness type and the fixing temperature. For the same reasons as described above, the image forming apparatus 10 controls the fixing temperature so that the fixing temperature increases in a stepwise manner as the paper weight of the paper thickness type increases.

Note that in the present embodiment, the paper thickness (paper weight) is described as an example paper property (sensing value) that influences print control. However, other paper properties, such as smoothness and Young's modulus, can also influence print control. FIG. 16C schematically illustrates the relationship between the smoothness and the fixing temperature. In FIG. 16C, the image forming apparatus 10 controls the fixing temperature to decrease in a stepwise manner as the smoothness increases. Note that paper having a high smoothness means that the toner can be easily fixed to the paper, and as such, toner can be adequately fixed to such smooth paper even when the fixing temperature is lowered. In this way, unnecessary energy consumption may be avoided, for example.

Note that the smoothness of paper can be determined based on the paper type, and coated paper is smoother than plain paper. Also, the Young's modulus is a measure of the deformability of paper and can be determined by conversion of the paper thickness or the paper weight, for example.

Also, appropriate print control may be implemented based on the paper size, which is another one of the paper settings. For example, when the paper size setting corresponds to the paper size of a postcard, the image forming apparatus 10 may implement control for performing so-called borderless printing. This control may cause the image forming apparatus 10 to form an image on the entire surface of the postcard (without margins). On the other hand, in the case where the paper size setting corresponds to A6 size paper, which has a paper size similar to that of a postcard, for example, control is implemented in the image forming apparatus 10 to secure margins when forming an image on the A6 size paper. Also, in some embodiments, the image forming apparatus 10 may be configured to implement control for reducing a heating area of the fixing device 16 when the paper size is smaller than a predetermined value and/or implement control for enlarging the heating area of the fixing device 16 when the paper size is larger than a predetermined value, for example. Further, the conveying speed and the fixing temperature may also be controlled based on the paper size setting, for example.

Second Embodiment

In the first embodiment, paper settings are set up by detecting the paper size and the paper thickness, determining the specific type of paper used based on a combination of the paper size and the paper thickness type, and setting up paper settings corresponding to the specific type of paper. According to a second embodiment of the present invention, the image forming apparatus 10 is configured to correct a paper thickness detection result in order to more accurately determine the paper thickness type.

Figure 17:
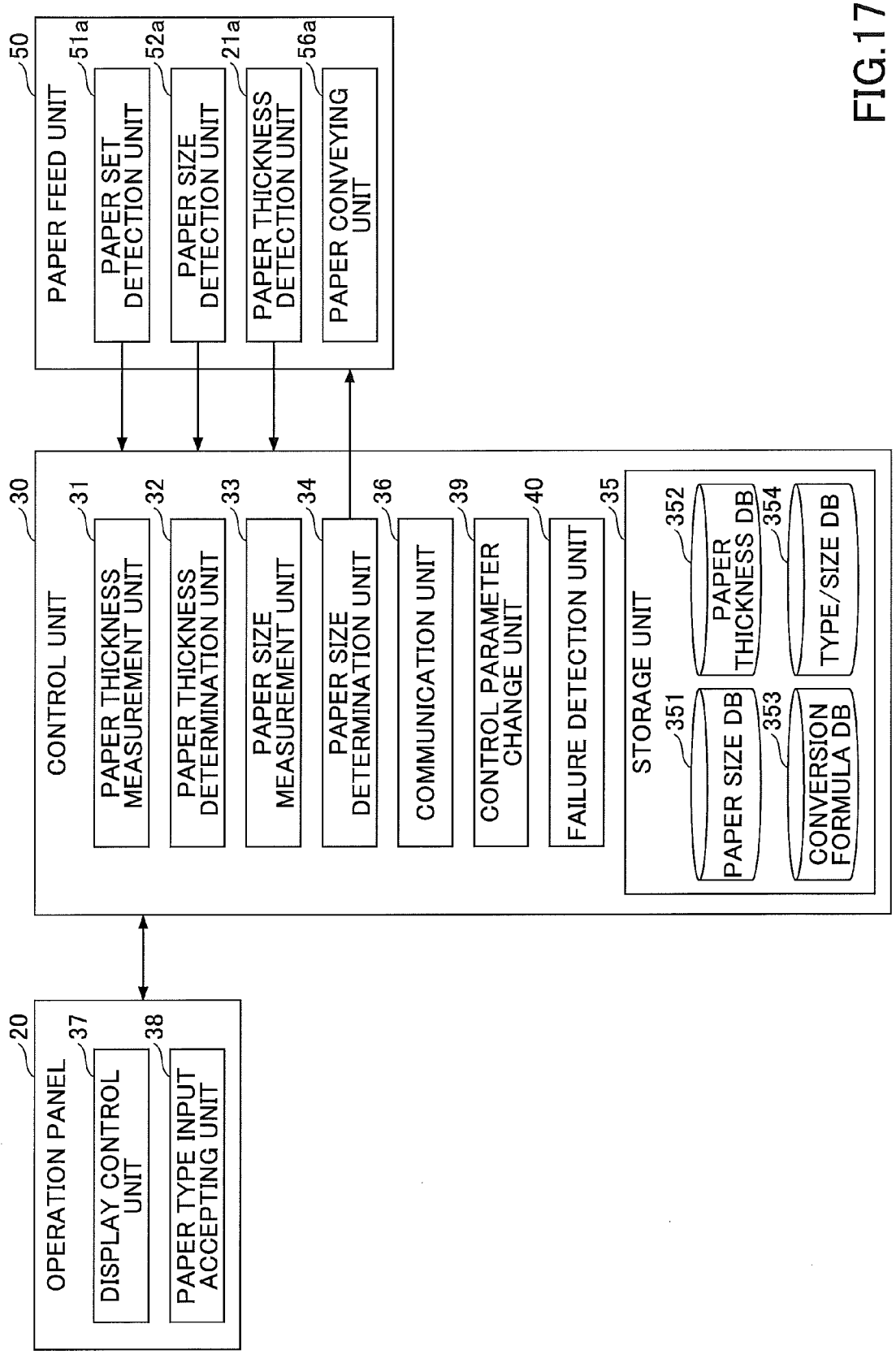
FIG. 17 is a block diagram illustrating an example functional configuration of the image forming apparatus according to a second embodiment of the present invention.

FIG. 17 is a block diagram illustrating an example functional configuration of the image forming apparatus 10 according to the second embodiment. Note that features of the image forming apparatus 10 according to the second embodiment that may be substantially identical to those of the image forming apparatus 10 according to the first embodiment illustrated in FIG. 7 are given the same reference numerals and their descriptions may be omitted. In the following, features of the second embodiment that differ from those of the first embodiment will be described. The control unit 30 according to the second embodiment additionally includes a control parameter change unit 39 and a failure detection unit 40. The control parameter change unit 39 changes control parameters based on the paper thickness that has been corrected by the paper thickness determination unit 32. The control parameters include parameters for image formation that are set up in the image forming apparatus 10, such as a fixing temperature, a linear velocity, a bias voltage, and the like. A specific value for a control parameter is determined by the paper thickness (paper type). The failure detection unit 40 detects a failure of the paper thickness detection sensor 21 as described below.

The paper thickness determination unit 32 according to the second embodiment has a function of correcting the paper thickness in addition to the functions described in connection with the first embodiment. Note that correcting the paper thickness involves improving the measurement accuracy of the paper thickness by taking into account an eccentricity component of a roller (error of the paper thickness measurement unit 31) as described below.

Figure 18A:
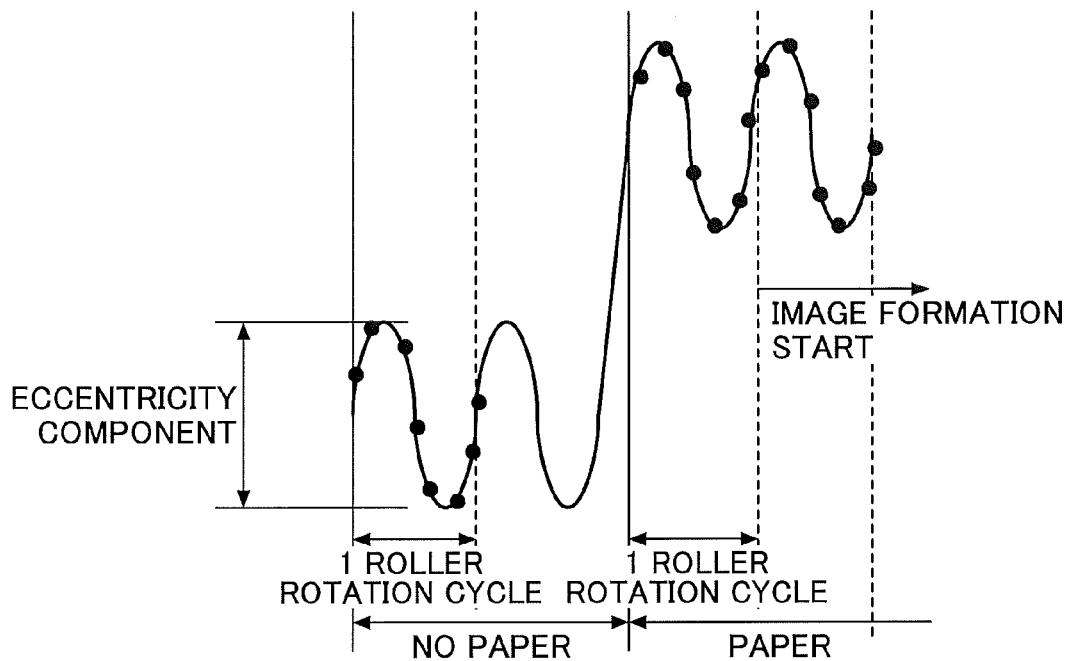
FIGS. 18A and 18B are diagrams schematically illustrating a method of correcting the paper thickness.
Figure 18B:
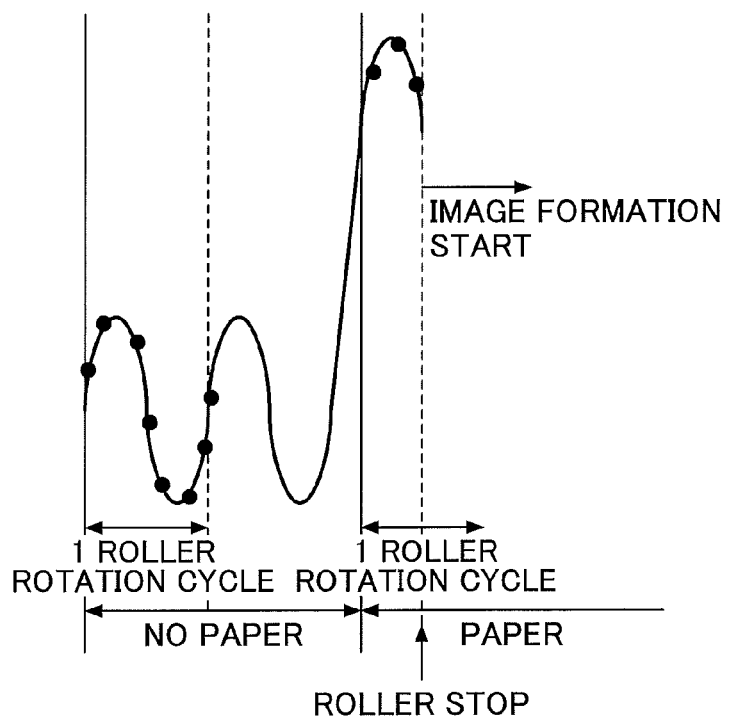

FIGS. 18A and 18B schematically illustrate a method of correcting the paper thickness. FIGS. 18A and 18B are diagrams indicating the distance of paper drawn into the paper thickness detection sensor 21 and the paper thickness that is detected. Black dots indicate measurement points. FIG. 18A illustrates a case where the roller can complete one rotation cycle while paper is present, and FIG. 18B illustrates a case where the roller cannot complete one rotation cycle while the paper is present.

In FIGS. 18A and 18B, the paper thickness fluctuations occurring while paper is not present are caused by an eccentricity component of the roller. The eccentricity component of one rotation cycle of the roller is constant, and the paper thickness detection sensor 21 can determine the roller eccentricity component by having the roller complete one rotation cycle. As illustrated in FIG. 18A, when paper is present, although the measurement value of the paper thickness detection sensor 21 shifts due to the thickness of the paper drawn into the paper thickness detection sensor 21, the eccentricity component of the roller remains the same as that when paper is not present.

In the case of detecting the paper thickness based on displacement of the roller in the above-described manner, the paper thickness determination unit 32 removes (cancels) the eccentric component of one rotation cycle of the roller to thereby improve measurement accuracy of the paper thickness. Specifically, the paper thickness determination unit 32 obtains measurements of the roller eccentricity component in a state where paper is not present and further obtains measurements of the roller eccentricity component in a state where paper present. The difference between the minimum value obtained in the state without paper and the minimum value obtained in the state with paper, the difference between the maximum value obtained in the state without paper and the maximum value obtained in the state with paper, and the difference between the median (or average) of the minimum value and the maximum value obtained in the state without paper and the median (or average) of the minimum value and the maximum value obtained in the state with paper are more accurate measurements of the paper thickness. That is, these correspond to corrected paper thicknesses.

Also, note that the paper thickness detection sensor 21 can determine a change from a state where no paper is present to a state where paper is present upon detecting a change greater than or equal to a threshold value in the paper thickness, for example. Also, because the time required for the roller to complete one rotation cycle is predetermined, the paper thickness detection sensor 21 can determine whether the roller has completed one rotation cycle based on the elapsed time, for example.

Note that when paper is fed from the manual feed tray 17, paper conveyed from the paper feed tray 15 may collide with the paper conveyed from the manual feed tray 17 if the roller completes one rotation cycle, for example. On the other hand, when the paper thickness detection mechanism 55 stops the paper fed from the manual feed tray 17 to prevent collision with paper conveyed from the paper feed tray 15, the roller may not be able to complete one rotation cycle. FIG. 18B illustrates an example case where the roller does not complete one rotation cycle as a result of being stopped by paper thickness detection mechanism 55. As illustrated in FIG. 18B, if the roller cannot complete one rotation cycle while paper is present, the paper thickness determination unit 32 cannot perform the above-described correction process of removing the roller eccentricity component. Note that the draw-in distance of the paper is set up in advance in the paper thickness detection mechanism 55 for each image forming apparatus 10.

Thus, when the paper thickness detection mechanism 55 draws in paper from the manual feed tray 17 for a first time, the paper thickness detection mechanism 55 stops the paper before the roller completes one rotation cycle so as to not interfere with paper conveying operations of paper fed from the paper feed tray 15, and the paper thickness determination unit 32 measures the paper thickness of the paper that has been drawn in up to this point as a provisional paper thickness. Then, based on this provisional paper thickness, the paper thickness type is determined in the manner described above with reference to the first embodiment.

Then, after image formation is started, the paper thickness detection sensor 21 detects the paper thickness of the paper once again. This time, the paper thickness determination unit 32 has the roller rotate at least one rotation cycle to remove the eccentricity component of the roller and obtain a corrected paper thickness that is more accurate as compared with the provisional paper thickness.

Note, however, in some cases, the control unit 30 may not have enough time to implement a control change based on the corrected paper thickness before a next image formation is started, for example. That is, the time period from when the paper thickness determination unit 32 determines the corrected paper thickness to the start of the next image formation may be too short.

FIG. 19 is a diagram illustrating an example of the paper thickness correction timing. In FIG. 19, temporal changes in the paper thickness detected by the paper thickness detection sensor 21, the actual fixing temperature, and the target temperature for the fixing temperature are indicated. Also, times t1 to t3 of FIG. 19 represent the following.

Time t1: paper thickness correction is completed.

Time t2: paper finishes passing through the roller of the paper detection sensor 21.

Time t3: next sheet of paper starts passing through the sheet detection sensor 21.

Note that at time t1, paper thickness correction is completed, and as a result, the correct paper thickness type can be confirmed. However, the image forming apparatus 10 is already forming an image at time t1. When the image forming apparatus 10 switches control parameters (e.g., conveying speed, fixing temperature, bias voltage) during image formation, image quality may be degraded due to density unevenness, for example. Thus, the image forming apparatus 10 does not change the control parameters at time t1 (when the image forming apparatus 10 is forming an image on paper), but changes the control parameters in between two image forming operations or before an image forming operation is started. In FIG. 19, the first image formation is completed at time t2, and as such, the control parameter change unit 39 can change the target temperature at time t2.

Note, however, that such control parameter change process is performed when it is determined that the actual temperature can reach the corresponding target value by the time the next image formation is started. In FIG. 19, time period T1 is required from completion of the first image formation on a first sheet of paper to the start of the next image formation on a next sheet of paper. On the other hand, the time period required for changing (increasing) the fixing temperature by 10 degrees is less than the time period T1. Therefore, when the first image formation is completed at time t2, the control parameter change unit 39 can change the target temperature.

Figure 20:
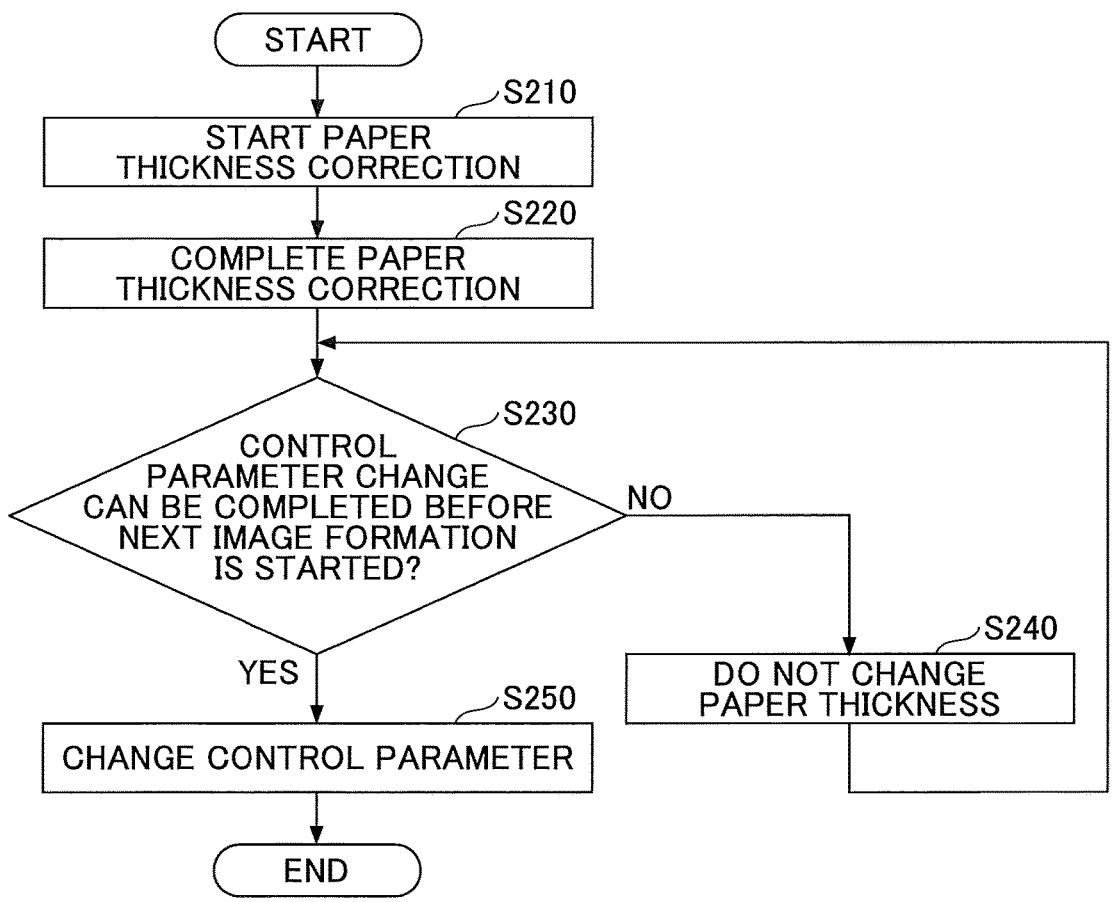
FIG. 20 is a flowchart illustrating an example process for changing a control parameter implemented by a control parameter change unit.

FIG. 20 is a flowchart illustrating an example process implemented by the control parameter change unit 39 for changing control parameters. The process of FIG. 20 may be started when image formation is started.

First, the paper thickness determination unit 32 starts a paper thickness correction process on paper fed from the manual feed tray 17 and passing through the paper thickness detection sensor 21 (step S210). Note that a provisional paper thickness of the paper is already measured by having the paper thickness detection mechanism 55 draw in paper by a predetermined draw-in distance that would not cause a collision with paper conveyed from the paper feed tray 15. Thus, the paper settings are set up based on the provisional paper thickness and the image forming apparatus 10 is controlled by control parameters corresponding to the paper settings determined before image formation.

Then, the paper thickness correction process is completed after the paper thickness detection mechanism 55 rotates the roller by one rotation cycle to draw in the paper and measure its thickness (step S220).

The control parameter change unit 39 determines whether a control parameter change process can be completed by the start of the next image formation (step S230). The control parameter change unit 39 holds the required time period T1 for starting the next image formation after completion of a previous image formation. The control parameter change unit 39 also holds the time required for changing the linear velocity by ΔVc (where ΔVc corresponds to a small change in the linear velocity), the time required for changing the fixing temperature by ΔT (where ΔT corresponds to a small change in the fixing temperature), and the time required for changing the bias voltage by ΔVt (where ΔVt corresponds to a small change in the bias voltage). Because the linear velocity, the fixing temperature, and the bias voltage that are currently set up, as well as the linear velocity, the fixing temperature, and the bias voltage for the next image formation are known, the control parameter change unit 39 can determine whether the control parameter change process can be completed before the start of the next image formation.

If a negative determination (NO) is made in step S230, the control unit 30 does not change the paper thickness based on the correction result (step S240). In this case, the process returns to step S230. If the control parameter change unit 39 determines that the control parameter change process can be completed before the start of the next image formation, the control parameter change unit 39 changes the control parameters (step S250).

By implementing the process operations as described above, the image forming apparatus 10 corrects the provisional paper thickness by having the roller of the paper thickness detection sensor 21 complete one rotation cycle to measure the paper thickness, and makes appropriate changes to control parameters while suppressing image quality degradation, for example.

<Alternative Example of Control Parameter Change Determination>

According to an alternative example, the control parameter change unit 39 may be configured to make a determination as to whether image quality can be ensured until image formation is completed, and if the image quality can be ensured, the control unit 30 may not change the paper thickness.

Figure 21:
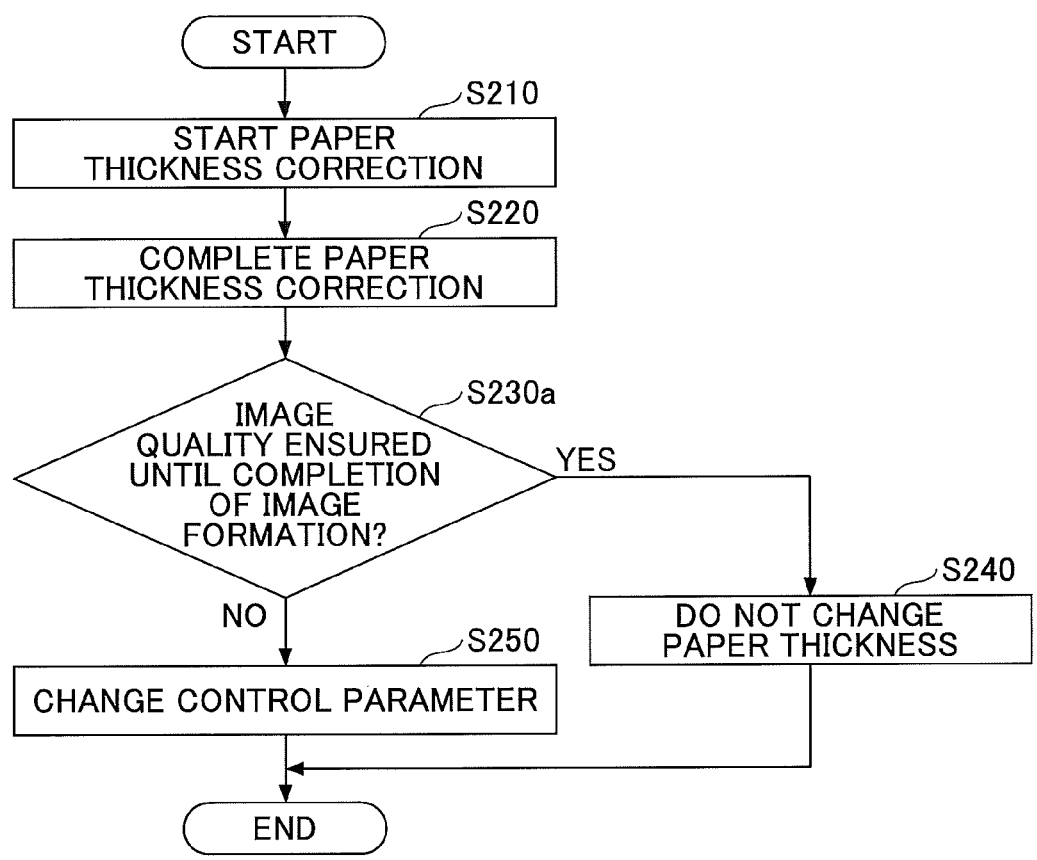
FIG. 21 is a flowchart illustrating another example process for changing a control parameter implemented by the control parameter change unit.

FIG. 21 is a flowchart illustrating another example process implemented by the control parameter change unit 39 for changing the control parameters. The process of FIG. 21 may be started when printing (image formation) is started. The process of FIG. 21 differs from that of FIG. 20 in that the control parameters are not changed when the image quality can ensured until the completion of printing.

Note that the process operations of steps S210 and S220 of FIG. 21 may be substantially the same as steps S210 and S220 of FIG. 20. Then, in step S230a of FIG. 21, the control parameter change unit 39 determines whether image quality and/or productivity can be ensured until printing on a designated number of pages is completed using the paper settings determined before image formation. That is, even if the control parameter change process cannot be completed before the start of a next printing operation on a next page, the image quality may not be degraded until printing operations are performed on several pages, for example. In such case, image quality may not be substantially compromised even if changes to the control parameters are not reflected in the next few printing operations on the next few pages, for example.

Note that the determination process of step S230a may be implemented using the following Table 5, for example.

TABLE 5

| PAPER THICKNESS USED | PAPER THICKNESS SETTING BEFORE PRINTING | CORRECTED PAPER THICKNESS SETTING AFTER PRINTING | NUMBER OF PAGES FOR WHICH IMAGE QUALITY IS ENSURED USING PRE-CORRECTED SETTING | NUMBER OF PAGES TO BE PRINTED | PRINT SETTING SWITCHING CONDITION |
|---|---|---|---|---|---|
| THIN PAPER | THIN PAPER | — | — | — | — |
|  | PLAIN PAPER | THIN PAPER | A | a | A < a |
| PLAIN PAPER | THIN PAPER | PLAIN PAPER | B | b | B < b |
|  | PLAIN PAPER | — | — | — | — |
|  | MIDDLE THICKNESS PAPER | PLAIN PAPER | C | c | C < c |

TABLE 5-continued

| PAPER THICKNESS USED | PAPER THICKNESS SETTING BEFORE PRINTING | CORRECTED PAPER THICKNESS SETTING AFTER PRINTING | NUMBER OF PAGES FOR WHICH IMAGE QUALITY IS ENSURED USING PRE-CORRECTED SETTING | NUMBER OF PAGES TO BE PRINTED | PRINT SETTING SWITCHING CONDITION |
|---|---|---|---|---|---|
| MIDDLE THICKNESS PAPER | PLAIN PAPER | MIDDLE THICKNESS PAPER | D | d | D < d |
| | MIDDLE THICKNESS PAPER | — | — | — | — |
| | THICK PAPER 1 | MIDDLE THICKNESS PAPER | E | e | E < e |
| THICK PAPER 1 | MIDDLE THICKNESS PAPER | THICK PAPER 1 | F | f | F < f |
| | THICK PAPER 1 | — | — | — | — |
| | THICK PAPER 2 | THICK PAPER 1 | G | g | G < g |

In Table 5, the number of pages for which image quality can be ensured is registered in association with each paper thickness setting (paper thickness type). Also, in Table 5, a paper thickness setting determined before the start of image formation and a corrected paper thickness setting determined after the start of image formation are associated with a paper thickness setting of paper that is actually used. Note that the paper thickness setting of paper that is actually used is the same as the corrected paper thickness determined after the start of image formation.

For example, when the paper thickness setting determined before the start of image formation is "plain paper" and the corrected paper thickness setting determined after the start of image formation is "thin paper", the number of pages for which image quality can be ensured using the paper thickness setting before correction is "A" pages. Note that Table 5 also indicates a designated number of pages "a" to be printed that is set up in the image forming apparatus 10 (the designated number of pages "a" to be printed can be changed by the user). Thus, the control parameter change unit 39 determines that the control parameters have to be changed when the condition "A<a" is satisfied (i.e., the designated number of pages to be printed is greater than the number of pages for which image quality can be ensured using the paper settings before correction). On the other hand, when A≥a (i.e., the number of pages for which image quality can be ensured using the paper settings before correction is greater than or equal to the designated number of pages to be printed), the control parameter changing unit 39 determines that image quality and/or productivity can be ensured using the paper settings determined before correction until printing operations on the designated number of pages are completed.

Note that whether image quality and productivity can be ensured may be determined using the same determination method, for example. That is, because productivity is determined based on whether image quality can be ensured, productivity can be ensured if image quality can be ensured.

If a positive determination (YES) is made in step S230a, the control parameter change unit 39 continues printing using the paper thickness setting before correction without changing the control parameters (step S240).

If a negative determination (NO) is made in step S230a, this means that at least one of image quality and productivity cannot be ensured using the paper settings determined before printing has been started, and as such, the control parameter change unit 39 changes the control parameters based on the corrected paper thickness setting (step S250).

That is, when image quality and/or productivity cannot be ensured, the control parameters are changed, and in this way, image quality and/or productivity can be ensured in printing the designated number of pages.

For example, the process of FIG. 21 may be performed before the process of FIG. 20. In other words, if a negative determination (NO) is made in step S230a of FIG. 21, the control parameter change unit 39 may proceed to step S230 of FIG. 20 to determine whether the control parameter change process can be completed before the start of the next image forming operation. Conversely, the determination of whether image quality can be ensured may be made after determining that the control parameter change process cannot be completed before the start of the next image formation, for example.

<Failure Determination of Paper Thickness Detection Sensor>

Also, the image forming apparatus 10 may be able to detect failure of the paper thickness detection sensor 21 by correcting the paper thickness, for example.

As illustrated in FIG. 17, the control unit 30 according to the second embodiment includes the failure detection unit 40. The failure detection unit 40 holds the paper thickness detected by the paper thickness detection sensor 21 before the start of image formation. That is, the failure detection unit 40 holds the eccentricity component of one rotation cycle of the roller of the paper thickness detection sensor 21. If the eccentricity component of one rotation cycle of the roller detected by the paper thickness detection sensor 21 after the start of image formation is greater than the eccentricity component before the start of image formation, the failure detection unit 40 may determine that a failure has occurred in the paper thickness detection sensor 21. That is, if the paper thickness detection sensor 21 is operating normally, the eccentricity component should not change even when the paper thickness is measured.

For example, assuming the eccentricity component of one rotation cycle of the roller measured before the start of image formation is ±30μ, if the eccentricity component of one rotation cycle of the roller measured after the start of image formation for correcting the paper thickness is greater than ±30μ, the failure detection unit 40 determines that a failure is occurring in the paper thickness detection sensor 21.

Figure 22:
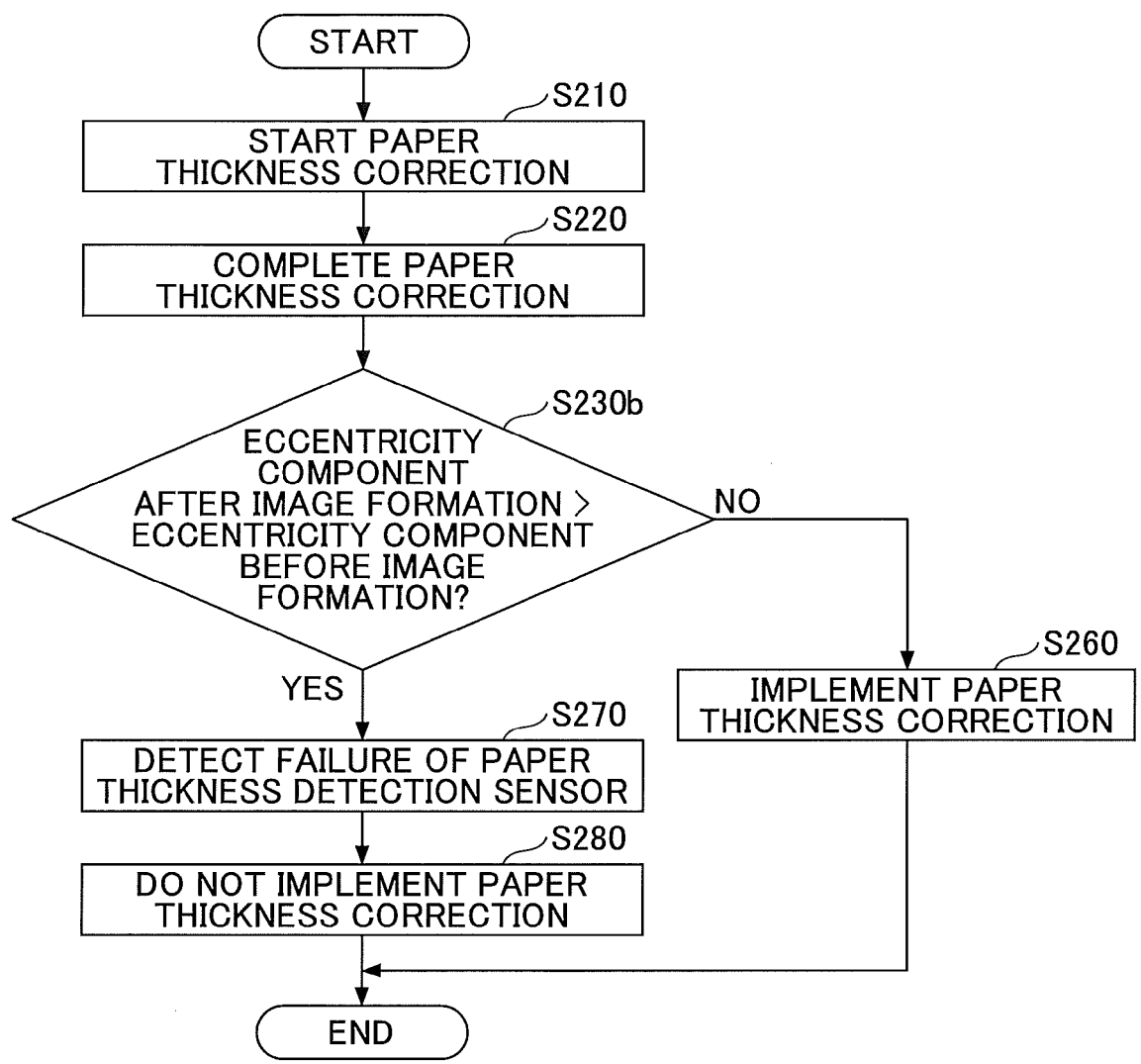
FIG. 22 is a flowchart illustrating an example process for detecting a failure of the paper thickness detection sensor implemented by a failure detection unit.

FIG. 22 is a flowchart illustrating an example process in which the failure detection unit 40 detects a failure of the paper thickness detection sensor 21. The process of FIG. 22 may be started when printing is started, for example.

Note that the process operations of steps S210 and S220 of FIG. 22 may be substantially the same as steps S210 and S220 of FIG. 20. Then, in step S230b, the failure detection unit 40 determines whether the eccentricity component measured after the start of image formation is greater than the eccentricity component measured before the start of image formation. Note that in some examples, instead of considering the eccentricity component after the start of image formation, the failure detection unit 40 may consider the margins formed by the image formation, for example.

If a negative determination (NO) is made in step S230b, the process proceeds to step S260, and the paper thickness correction is implemented.

If a positive determination (YES) is made in step S230b, the failure detection unit 40 determines that a failure is occurring in the paper thickness detection sensor 21 (step S270).

In this case, the paper thickness correction may not be accurate, and as such, the control parameter change unit 39 does not implement the paper thickness correction (step S280). That is, the image forming apparatus 10 continues printing using the paper thickness setting determined before the start of image formation. In this way, the image forming apparatus 10 can perform printing using the paper thickness setting determined based on the paper thickness measured by the paper thickness detection sensor 21 before the failure has been detected.

Alternatively, the control unit 30 may determine that the paper thickness measured before the start of image formation is not adequately reliable and stop the printing operation, for example. In this case, an error message is preferably displayed on the operation panel 20 indicating that a failure of the paper thickness detection sensor 21 has been detected, for example.

By implementing paper thickness correction based on a detection result of the failure detection unit 40 in the above-described manner, for example, output of printed matter with low image quality due to a failure of the paper thickness detection sensor 21 or an inaccurate measurement of the paper thickness may be prevented, for example.

Other Examples

Although the present invention has been described above with reference to certain illustrative embodiments, the present invention is not limited to these embodiments, and numerous variations and modifications may be made without departing from the scope of the present invention.

For example, in the above-described embodiments, the paper thickness is converted into paper weight in grams per square meter (grammage) as one of the paper properties. However, in other embodiments, the paper thickness may be converted into other types of paper weights, such as ream weight. The ream weight refers to the weight of 1000 sheets of paper. If the paper size is known, paper weight in grams per square meter (grammage) and the ream weight can be converted from one to the other.

Also, in the above-described embodiments, the image forming apparatus 10 is described as an electrophotographic image forming apparatus that forms an image through an electrophotography process. However, the image forming apparatus 10 may also be configured to form an image using an inkjet method, for example. In this case, the image forming apparatus 10 may control an ejection speed and an ejection amount of ink droplets based on the paper thickness type, for example. Also, the image forming apparatus 10 may control the ejection speed and the ejection amount of the ink droplets based on the paper type. Also, the image forming apparatus 10 may implement control for changing an image forming range to perform borderless printing depending on the paper size, for example.

Also, the image forming apparatus 10 may be configured to form an image using a thermal transfer method. In this case, the image forming apparatus 10 may control the temperature for thermal transfer and the paper conveying speed based on the paper thickness type, for example.

Also, in the above-described embodiments, the image forming apparatus 10 converts paper thickness into paper weight. However, in some embodiments, the conversion from paper thickness to paper weight may be performed by an external device, for example. In this case, the communication unit 36 of the image forming apparatus 10 may transmit the measured paper thickness and the paper type selected by the user to a server connected to the image forming apparatus 10 via a network. In turn, the server may select the appropriate conversion formula based on the selected paper type, convert the paper thickness into paper weight, and transmit the paper weight to the image forming apparatus 10. Further, in some embodiments, the server may transmit the corresponding paper thickness type instead of the paper weight to the image forming apparatus 10. In this case, the image forming apparatus 10 does not have to hold conversion formulas for various paper types, and as such, the configuration and process operations of the image forming apparatus 10 can be simplified.

Also, although the conversion formula representing an association between paper thickness and paper weight is represented by a straight line, the association between paper thickness and paper weight may also be represented by a curve, such as a quadratic equation or a cubic equation, for example.

Note that the paper type input accepting unit 38 as described above is an example of an accepting unit, the paper thickness measurement unit 31 is an example of a thickness measurement unit, the paper thickness determination unit 32 is an example of a setting determination unit, the conversion formula stored in the conversion formula DB 353 is an example of conversion information, the paper size measurement unit 33 is an example of a dimension measurement unit, and the paper size determination unit 34 is an example of a size determination unit. Further, the type/size table stored in the type/size DB 354 is an example of type/size information, the paper size table stored in the paper size DB 351 is an example of size information, the display control unit 37 is an example of a display control unit, the display of the operation panel 20 is an example of a display unit, the communication unit 36 is an example of a communication unit, the control parameter change unit 39 is an example of a control change unit, and the failure detection unit 40 is an example of a failure detection unit.

What is claimed is:

1. An image forming apparatus that forms an image on a sheet material based on a sheet material setting relating to the sheet material, the image forming apparatus comprising:
   an accepting unit configured to accept a selection of a sheet material type;
   a thickness measurement unit configured to measure a thickness of the sheet material; and
   a setting determination unit configured to determine the sheet material setting that relates to the thickness of the sheet material based on the sheet material type accepted by the accepting unit and the thickness of the sheet material measured by the thickness measurement unit, wherein the setting determination unit
refers to conversion information that is associated with the sheet material type accepted by the accepting unit, the conversion information including information for converting the thickness of the sheet material into the sheet material setting that relates to the thickness of the sheet material and information for converting the thickness of the sheet material into a paper weight for each sheet material type;
converts the thickness of the sheet material measured by the thickness measurement unit into the sheet material setting that relates to the thickness of the sheet material and into the paper weight using the conversion information that is associated with the sheet material type accepted by the accepting unit; and
determines the sheet material setting that relates to the thickness of the sheet material based on the paper weight.

2. The image forming apparatus according to claim 1, further comprising:
a dimension measurement unit configured to measure a dimension of the sheet material; and
a size determination unit configured to determine the sheet material setting that relates to a size of the sheet material based on the sheet material type accepted by the accepting unit and the dimension of the sheet material measured by the dimension measurement unit.

3. The image forming apparatus according to claim 2, wherein the size determination unit
associates each sheet material type with one or more corresponding sizes of the sheet material based on type and size information, and acquires the one or more corresponding sizes associated with the sheet material type accepted by the accepting unit; and
refers to dimension information associating each corresponding size of the sheet material with a corresponding dimension and determines the sheet material setting that relates to the size of the sheet material by identifying, from among the acquired one or more corresponding sizes of the sheet material, a corresponding size with the corresponding dimension being within a predetermined range of the dimension of the sheet material measured by the dimension measurement unit.

4. The image forming apparatus according to claim 2, further comprising:
a display control unit configured to display the sheet material setting relating to the thickness of the sheet material that is determined by the setting determination unit and the sheet material setting relating to the size of the sheet material that is determined by the size determination unit on a display unit.

5. The image forming apparatus according to claim 1, wherein
when the accepting unit accepts the selection of a predetermined sheet material type as the sheet material type, the setting determination unit determines the sheet material setting relating to the thickness of the sheet material that is associated with the accepted predetermined sheet material type by acquiring a preregistered sheet material setting relating to the thickness of the accepted predetermined sheet material.

6. The image forming apparatus according to claim 5, wherein
the predetermined sheet material type is associated with one unique sheet material setting relating to the thickness of the sheet material.

7. The image forming apparatus according to claim 6, further comprising:
a display control unit configured to display a list of sheet material types on a display unit for enabling the accepting unit to accept the selection of the sheet material type;
wherein the display control unit displays sheet material types that can be recognized by a user based on appearance of the sheet material including at least one of a shape, a color, and a glossiness of the sheet material, and the display control unit refrains from displaying sheet material types that cannot be selected without determining the size or the thickness of the sheet material.

8. The image forming apparatus according to claim 1, wherein
the thickness measurement unit is arranged in a conveying path for conveying the sheet material; and
the thickness measurement unit measures the thickness of the sheet material after stopping the sheet material that is being conveyed.

9. The image forming apparatus according to claim 8, further comprising:
a control parameter change unit configured to change a control parameter for image formation;
wherein the thickness measurement unit stops the sheet material that is being conveyed to measure the thickness of the sheet material before image formation is started, and after image formation is started, the thickness measurement unit measures the thickness of the sheet material that is being conveyed taking into account an error of the thickness measurement unit;
wherein the control parameter change unit changes the control parameter for image formation based on the thickness of the sheet material measured taking into account the error of the thickness measurement unit; and
wherein image formation is performed on the sheet material based on the control parameter changed by the control parameter change unit.

10. The image forming apparatus according to claim 9, wherein
the thickness measurement unit rotates a roller by one rotation cycle to detect an eccentricity component of the roller in response to detecting a change greater than or equal to a threshold value in the thickness of the sheet material being measured, and removes the eccentricity component from the thickness of the sheet material.

11. The image forming apparatus according to claim 10, further comprising:
a failure detection unit configured to detects a failure of the thickness measurement unit upon determining that the eccentricity component measured after the start of image formation is greater than the eccentricity component measured before the start of image formation.

12. The image forming apparatus according to claim 11, wherein
the failure detection unit continues image formation using the sheet material setting determined before the start of image formation upon detecting the failure of the thickness measurement unit.

13. The image forming apparatus according to claim 9, wherein
when the thickness measurement unit measures the thickness of the sheet material after image formation is started, the control parameter change unit refrains from changing the control parameter while the image formation is performed on the sheet material.

14. The image forming apparatus according to claim 13, wherein
the control parameter change unit refrains from changing the control parameter when a time period required for changing a current control parameter for a current image formation to a next control parameter for a next image formation is longer than a time period from an end of the current image formation to a start of the next image formation.

15. The image forming apparatus according to claim 9, wherein the control parameter change unit
refers to page number registration information including a number of pages registered in association with the sheet material setting determined before the start of image formation and the sheet material setting determined after the start of image formation;
refrains from changing the control parameter when the number of pages registered in the page number registration information is greater than a number of pages on which image formation is to be performed; and
changes the control parameter when the number of pages on which image formation is to be performed is greater than or equal to the number of pages registered in the page number registration information.

16. The image forming apparatus according to claim 1, further comprising:
a communication unit configured to transmit the sheet material type accepted by the accepting unit and the thickness of the sheet material measured by the thickness measurement unit to an external device;
wherein the external device implements the setting determination unit and determines the sheet material setting that relates to the thickness of the sheet material based on the sheet material type accepted by the accepting unit and the thickness of the sheet material measured by the thickness measurement unit; and
wherein the communication unit acquires the determined sheet material setting that relates to the thickness of the sheet material from the external device.

17. A computer program product comprising a non-transitory computer-readable medium having a program recorded thereon that is executable by an image forming apparatus configured to form an image on a sheet material based on a sheet material setting relating to the sheet material, the program when executed causing the image forming apparatus to implement processes of:
accepting a selection of a sheet material type;
measuring a thickness of the sheet material; and
determining the sheet material setting that relates to the thickness of the sheet material based on the accepted sheet material type and the measured thickness of the sheet material, wherein the sheet material setting is determined by:
referring to conversion information associated with the accepted sheet material type, the conversion information including information for converting the thickness of the sheet material into the sheet material setting that relates to the thickness of the sheet material and information for converting the thickness of the sheet material into a paper weight for each sheet material type;
converting the measured thickness of the sheet material into the sheet material setting that relates to the thickness of the sheet material and into the paper weight using the conversion information associated with the accepted sheet material type; and
determining the sheet material setting that relates to the thickness of the sheet material based on the paper weight.

18. A setting method implemented by an image forming apparatus configured to form an image on a sheet material based on a sheet material setting relating to the sheet material, the setting method comprising:
accepting a selection of a sheet material type;
measuring a thickness of the sheet material; and
determining the sheet material setting that relates to the thickness of the sheet material based on the accepted sheet material type and the measured thickness of the sheet material, wherein the sheet material setting is determined by:
referring to conversion information associated with the accepted sheet material type, the conversion information including information for converting the thickness of the sheet material into the sheet material setting that relates to the thickness of the sheet material and information for converting the thickness of the sheet material into a paper weight for each sheet material type;
converting the measured thickness of the sheet material into the sheet material setting that relates to the thickness of the sheet material and into the paper weight using the conversion information associated with the accepted sheet material type; and
determining the sheet material setting that relates to the thickness of the sheet material based on the paper weight.

* * * * *